United States Patent
Li et al.

(10) Patent No.: US 12,294,214 B1
(45) Date of Patent: May 6, 2025

(54) METHOD AND SYSTEM FOR OPTIMIZED SCHEDULING OF INTEGRATED ENERGY SYSTEM AND ELECTRONIC APPARATUS

(71) Applicant: HUAZHONG UNIVERSITY OF SCIENCE AND TECHNOLOGY, Hubei (CN)

(72) Inventors: Chaoshun Li, Hubei (CN); Pengxia Chang, Hubei (CN); Qiannan Zhu, Hubei (CN); Tian Zhu, Hubei (CN); Jiakang Shi, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/666,714

(22) Filed: May 16, 2024

(30) Foreign Application Priority Data

Dec. 4, 2023 (CN) .......................... 202311642578.2

(51) Int. Cl.
*H02J 3/00* (2006.01)
(52) U.S. Cl.
CPC .......... *H02J 3/003* (2020.01); *H02J 2203/10* (2020.01)

(58) Field of Classification Search
CPC ................. G05B 15/02; G05B 19/042; G05B 19/41865; G05B 17/02; G05B 13/048; G05B 2219/2639; G05B 23/024
See application file for complete search history.

(56) References Cited

PUBLICATIONS

Optimal scheduling of electricity and hydrogen integrated energy system considering multiple uncertainties (Year: 2024).*

* cited by examiner

*Primary Examiner* — Darrin D Dunn
(74) *Attorney, Agent, or Firm* — JCIPRNET

(57) ABSTRACT

A method and a system for optimized scheduling of an integrated energy system are provide. The method includes: respectively obtaining marginal distribution functions of electricity price, hydrogen price, wind power, photovoltaic power, and load within a preset time period according to historical data to predict relevant parameters; adjusting a predicted value of the load based on a dynamic change in an unit electricity use consumption resource within the preset time period, and obtaining a load value after performing a demand response based on the electricity price to reduce a peak-valley difference of the load; considering decision-maker preferences, establishing an optimization scheduling model that simultaneously considers economic and environmental factors; converting the multi-objective model into a single-objective model and using the CPLEX solver to solve the model.

7 Claims, 16 Drawing Sheets

```
┌─────────────────────────────────────────────────────────┐
│ Respectively obtain marginal distribution functions of a unit electricity │
│ use consumption resource, a unit hydrogen energy harvesting │
│ resource, a wind power, a photovoltaic power, and a load within a │
│ preset time period according to historical data; determine a first joint │
│ distribution function of the unit electricity use consumption resource and │
│ the unit hydrogen energy harvesting resource and a second joint │
│ distribution function of the wind power, the photovoltaic power, and the │
│ load based on the marginal distribution functions; and then predict a │     S101
│ unit electricity use consumption resource, a unit hydrogen energy │
│ harvesting resource, a maximum wind power, a maximum photovoltaic │
│ power, and a load within a preset time period based on the first joint │
│ distribution function and the second joint distribution function │
└─────────────────────────────────────────────────────────┘
                             │
                             ▼
┌─────────────────────────────────────────────────────────┐
│ Adjust a predicted value of the load based on a dynamic change of the │     S102
│ unit electricity use consumption resource within the preset time period │
│ to obtain a load value after performing a demand response based on │
│ the unit electricity use consumption resource to reduce a peak-valley │
│ difference of the load │
└─────────────────────────────────────────────────────────┘
                             │
                             ▼
┌─────────────────────────────────────────────────────────┐
│ Obtain a first objective function of a system operating consumption │
│ resource and a second objective function of an environmental │
│ consumption resource based on predicted values of the unit electricity │    S103
│ use consumption resource, the unit hydrogen energy harvesting │
│ resource, the maximum wind power, and the maximum photovoltaic │
│ power and based on a load value of a unit electricity use consumption │
│ resource response, wherein the first objective function includes an │
│ electricity use consumption resource, a penalty consumption resource │
│ for not using the wind energy and the light energy, and a negative │
│ number of a resource harvested by converting the wind energy and the │
│ light energy into the hydrogen energy, and the second objective │
│ function includes a carbon emission consumption resource caused by │
│ electricity use │
└─────────────────────────────────────────────────────────┘
                             │
                             ▼
┌─────────────────────────────────────────────────────────┐
│ Weight and sum the first objective function and the second objective │    S104
│ function to obtain an overall objective function, and then solve for the │
│ overall objective function to obtain an optimized scheduling result of the │
│ integrated energy system within the preset time period │
└─────────────────────────────────────────────────────────┘
```

FIG. 1

Model correlation between wind power generation, photovoltaic power generation, and a load and correlation between an electricity price and a hydrogen price by adopting a Copula function, and generate a typical scenario of each season

↓

Introduce a user-side price-based demand response, and encourage a user to adjust an electricity use load using a seasonal peak electricity price

↓

Consider preferences of a decision maker, and establish an optimized scheduling model considering economic efficiency and environmental protection at the same time

↓

Transform a multi-objective model into a single-objective model, and solve for the model using a CPLEX solver

FIG. 2

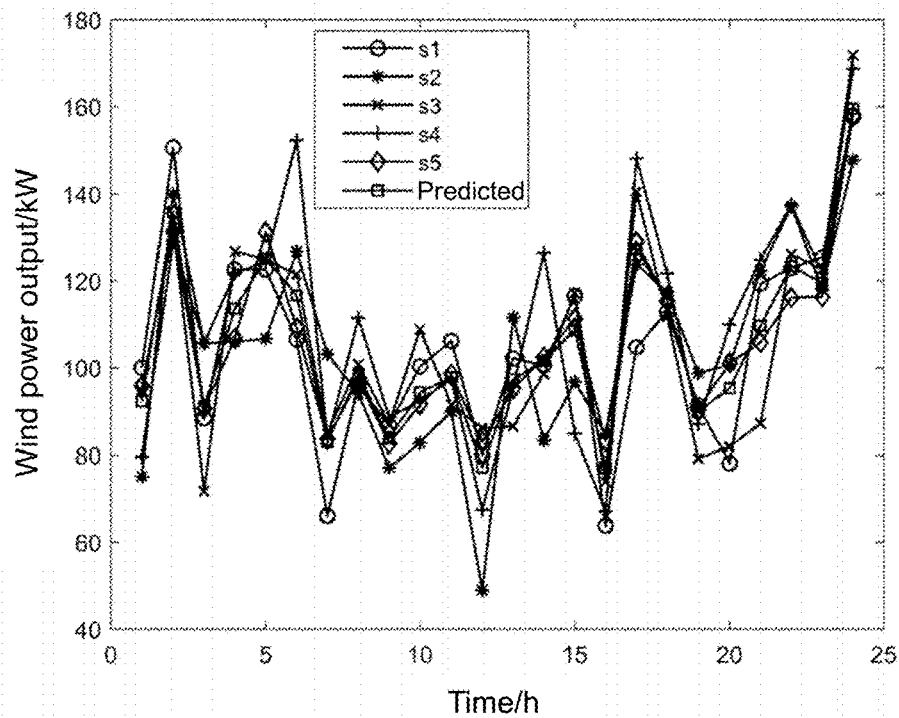

FIG. 3A

METHOD AND SYSTEM FOR OPTIMIZED SCHEDULING OF INTEGRATED ENERGY SYSTEM AND ELECTRONIC APPARATUS

CROSS-REFERENCE TO RELATED APPLICATION

This application claims the priority benefit of China application serial no. 202311642578.2, filed on Dec. 4, 2023. The entirety of the above-mentioned patent application is hereby incorporated by reference herein and made a part of this specification.

BACKGROUND

Technical Field

The disclosure belongs to the field of integrated energy scheduling, and more specifically relates to a method and a system for optimized scheduling of an integrated energy system.

Description of Related Art

With the proposal of the "double carbon" goal, promoting the development of renewable energy in the power industry has become a long-term goal, and energy low-carbon transformation has become the only way for current energy reform. As a clean energy with high energy density and strong environmental friendliness, hydrogen energy plays a very important role in the process of energy decarbonization.

Using clean energy to produce hydrogen can further reduce carbon emissions. The combination of wind energy, solar energy, and hydrogen energy forms an electricity and hydrogen integrated energy system, which is a typical application scenario for low-carbon energy. By adding the hydrogen production-sales link to the integrated energy system, additional profits can be obtained, the economic efficiency of the system can be improved, and the development of hydrogen production can be promoted.

Since renewable energy output, load demand, electricity prices, and hydrogen prices have certain volatility and randomness, there are also operational risks when promoting the optimized operation of the system. In existing research, the correlation of wind, solar, and load is rarely considered at the same time. Even if considered, seasonal differences are not considered. In addition, current research on electricity and hydrogen prices mostly focuses on the market pricing mechanism and does not consider the correlation of electricity price and hydrogen price.

SUMMARY

In view of the shortcomings of the prior art, objectives of the disclosure are to provide a method and a system for optimized scheduling of an integrated energy system, which aim to solve the issue that the existing integrated energy optimized scheduling method does not consider the correlation of wind, solar, and load and the correlation of electricity price and hydrogen price, does not consider seasonal differences, and economical and environmental factors are also not integratedly considered during the scheduling process, causing the economic efficiency of scheduling to be unable to meet demand.

To achieve the above objectives, in the first aspect, the disclosure provides a method for optimized scheduling of an integrated energy system. The integrated energy system includes wind energy, solar energy, and hydrogen energy. The method includes the following steps.

Marginal distribution functions of a unit electricity use consumption resource, a unit hydrogen energy harvesting resource, a wind power, a photovoltaic power, and a load within a preset time period are respectively obtained according to historical data. A first joint distribution function of the unit electricity use consumption resource and the unit hydrogen energy harvesting resource and a second joint distribution function of the wind power, the photovoltaic power, and the load are determined based on the marginal distribution functions. A unit electricity use consumption resource, a unit hydrogen energy harvesting resource, a maximum wind power, a maximum photovoltaic power, and a load within a preset time period are then predicted based on the first joint distribution function and the second joint distribution function. Electricity use refers to use of electricity outside the integrated energy system, the hydrogen energy harvesting resource is obtained through transporting the hydrogen energy outward, and the load refers to electricity use amount.

A predicted value of the load is adjusted based on a dynamic change of the unit electricity use consumption resource within the preset time period to obtain a load value after performing a demand response based on the unit electricity use consumption resource to reduce a peak-valley difference of the load.

A first objective function of a system operating consumption resource and a second objective function of an environmental consumption resource are obtained based on predicted values of the unit electricity use consumption resource, the unit hydrogen energy harvesting resource, the maximum wind power, and the maximum photovoltaic power and based on a load value of a unit electricity use consumption resource response. The first objective function includes an electricity use consumption resource, a penalty consumption resource for not using the wind energy and the solar energy, and a negative number of a resource harvested by converting the wind energy and the solar energy into the hydrogen energy. The second objective function includes a carbon emission consumption resource caused by electricity use.

The first objective function and the second objective function are weighted and summed to obtain an overall objective function, and the overall objective function is then solved to obtain an optimized scheduling result of the integrated energy system within the preset time period.

Specifically, the optimized scheduling result includes electricity use, battery output, hydrogen energy storage output, hydrogen energy export, photovoltaic output, and wind power output during each time period.

It can be understood that the preset time period may be divided into months or quarters for a year. For example, one preset time period corresponds to one month or one quarter. In addition, two quarters with similar scheduling plans may also be merged into one quarter. For example, spring and autumn may be merged into the transition season. Persons skilled in the art may divide the preset time period according to the actual situation of scheduling of the integrated energy system, and the disclosure does not impose any limitation thereto.

In an embodiment, the preset time period in the disclosure may respectively be the transition season, summer, and winter.

It should be noted that the "consumption resource" mentioned in the disclosure refers to price, cost, expense, sales income, fee, etc. Specifically, the unit electricity use consumption resource refers to the price of electricity purchased from the power grid, the unit hydrogen energy harvesting resource refers to hydrogen price of selling the hydrogen energy, the system operating consumption resource refers to the operating cost of the system, and the environmental consumption resource refers to the environmental cost.

In a possible implementation, the preset time period includes multiple time periods, and the load value based on the unit electricity use consumption resource response is determined through the following formula:

$$\begin{bmatrix} q_1 \\ q_2 \\ \vdots \\ q_m \end{bmatrix} = \begin{bmatrix} q_{01} \\ q_{02} \\ \vdots \\ q_{0m} \end{bmatrix} + \begin{bmatrix} q_{01} & \cdots & \cdots & 0 \\ \vdots & q_{02} & \cdots & \vdots \\ \vdots & \vdots & \ddots & \vdots \\ 0 & \cdots & \cdots & q_{0m} \end{bmatrix} \begin{bmatrix} E \end{bmatrix} \begin{bmatrix} \Delta p_1/p_{10} \\ \Delta p_2/p_{20} \\ \vdots \\ \Delta p_m/p_{m0} \end{bmatrix}$$

where $q_i$ is load after an i-th time period demand response, $q_{0i}$ is a predicted value of the load before the i-th time period demand response, i=1, 2, ..., m, where m is a total number of periods of the preset time period, $\Delta p_j$ is an increment of the unit electricity use consumption resource before and after a j-th time period demand response, $\Delta p_j = p_j - p_{j0}$, j=1, 2, ..., m, $p_{j0}$ is the unit electricity use consumption resource before the j-th time period demand response, which refers to the usual electricity price, $p_j$ is the unit electricity use consumption resource after the j-th time period demand response, which refers to the time-of-use electricity price and is a predicted unit electricity use consumption resource, and E is an elasticity matrix of the load and the unit electricity use consumption resource.

$$E = \begin{bmatrix} e_{11} & e_{12} & \cdots & e_{1m} \\ e_{21} & e_{22} & \cdots & e_{2m} \\ \vdots & \vdots & & \vdots \\ e_{m1} & e_{m2} & \cdots & e_{mm} \end{bmatrix}$$

where $$e_{ij} = \frac{\Delta q_i}{q_{0i}} \bigg/ \frac{\Delta p_j}{p_{j0}},$$

$\Delta q_i$ is a load change before and after the demand response, $\Delta q_i = q_i - q_{0i}$, and $e_{ij}$ is an elasticity coefficient. When j=i, $e_{ij}$ is a self-elasticity coefficient, and when j≠i, $e_{ij}$ is a cross-elasticity coefficient.

In a possible implementation, the marginal distribution functions of the unit electricity use consumption resource, the unit hydrogen energy harvesting resource, the wind power, the photovoltaic power, and the load are estimated by adopting a non-parametric kernel density estimation method.

The first joint distribution function of the unit electricity use consumption resource and the unit hydrogen energy harvesting resource is generated using a two-dimensional Frank Copula function.

The second joint distribution function of the wind power, the photovoltaic power, and the load is generated using a three-dimensional Frank Copula function.

Copula link functions C(·) used in the above processes of generating the joint distribution functions are respectively:

$$C(v_1, v_2, \theta_1) = -\frac{1}{\theta_1} \ln\left[1 + \frac{(\exp(-\theta_1 v_1) - 1)(\exp(-\theta_1 v_2) - 1)}{\exp(-\theta_1) - 1}\right]$$

where $v_1$ and $v_2$ are respectively the marginal distribution functions of the unit electricity use consumption resource and the unit hydrogen energy harvesting resource, and $\theta_1$ is a parameter of the two-dimensional Frank Copula function;

$$C(u_1, u_2, u_3) = -\frac{1}{\theta_2} \ln\left[1 + \frac{(\exp(-\theta_2 u_1) - 1)(\exp(-\theta_2 u_2) - 1)(\exp(-\theta_2 u_3) - 1)}{[\exp(-\theta_2) - 1]^2}\right]$$

where $u_1$, $u_2$, and $u_3$ respectively represent the marginal distribution functions of the wind power, the photovoltaic power, and the load, and $\theta_2$ is a parameter of the three-dimensional Frank Copula function.

The first joint distribution function and the second joint distribution function are sampled, and a sampling result and the two joint distribution functions are inversely transformed to obtain the unit electricity use consumption resource, the unit hydrogen energy harvesting resource, the maximum wind power, the maximum photovoltaic power, and the load corresponding to each time period.

In a possible implementation, the first objective function is:

$$F_1 = \min(f_{buy} + f_{dis} - f_{sell,H})$$

where $F_1$ is the system operating consumption resource, $f_{buy}$ is the electricity use consumption resource of the system, $f_{dis}$ is the penalty consumption resource for not using the wind energy and the solar energy of the system, and $f_{sell,H}$ is the resource harvested by converting the wind energy and the solar energy into the hydrogen energy.

$$f_{buy} = \sum_{t=1}^{T} \beta_t P_{buy}(t)$$

where $\beta_t$ is the predicted value of the unit electricity use consumption resource during a time period t and $P_{buy}(t)$ is the load during the time period t.

$$f_{dis} = \omega \sum_{t=1}^{T} [P_{W,dis}(t) + P_{PV,dis}(t)]$$

where $\omega$ is a unit penalty consumption resource for not using the wind energy and the solar energy, and $P_{W,dis}(t)$ and $P_{PV,dis}(t)$ are respectively a wind abandonment power and a solar abandonment power during the time period t. The wind abandonment power refers to unused wind power, and the solar abandonment power refers to unused photovoltaic power.

$$f_{sell,H} = \sum_{t=1}^{T} \alpha_t H_{sell}(t)$$

where $\alpha_t$ is the unit hydrogen energy harvesting resource during the time period t and $H_{sell}$ (t) is the hydrogen energy transported outward during the time period t.

In a possible implementation, the second objective function is:

$$F_2 = \min f_{CO_2}$$

$$f_{CO_2} = \begin{cases} \lambda E_{IESt}, & E_{IESt} \leq l \\ \lambda l + \lambda(1+\alpha)(E_{IESt} - l), & l \leq E_{IESt} \leq 2l \\ \lambda(2+\alpha)l + \lambda(1+2\alpha)(E_{IESt} - 2l), & 2l \leq E_{IESt} \leq 3l \\ \lambda(3+3\alpha)l + \lambda(1+3\alpha)(E_{IESt} - 3l), & 3l \leq E_{IESt} \leq 4l \\ \lambda(4+6\alpha)l + \lambda(1+4\alpha)(E_{IESt} - 4l), & E_{IESt} \geq 4l \end{cases}$$

where $F_2$ is the environmental consumption resource, $f_{CO_2}$ is a tiered carbon emission consumption resource of the system, $\lambda$ is a basic consumption resource of carbon emission, l is an interval division length of carbon emission, $\alpha$ is a growth rate of consumption resource, and $E_{IESt}$ is a carbon emission amount.

In a possible implementation, the carbon emission amount $E_{IESt}$ is determined through the following formula:

$$\begin{cases} E_{IESt} = E_{IESa} - E_{IES} \\ E_{IESa} = \chi_{ca} P_{buy} \\ E_{IES} = \chi_c P_{buy} \end{cases}$$

where $E_{IESa}$ is an actual carbon emission amount generated by the system, $E_{IES}$ is a total carbon emission quota allocated to the system, $\chi_{ca}$ is a carbon emission amount generated by the system after a unit of electricity is used, and $\chi_c$ is a free carbon emission quota obtained by the system after a unit of electricity is used from outside the system.

In a possible implementation, constraints of the overall objective function include photovoltaic and wind power output constraints, an electric power constraint, a battery constraint, a hydrogen energy storage constraint, and a power balance constraint.

In a possible implementation, the power balance constraint is:

$$P_{load} = P_{PV} + P_W + P_{bat}^{dis} - P_{bat}^{ch} + P_{tank}^{dis} - P_{tank}^{ch} + P_{buy}$$

where $P_{load}$ is the load demand power, $P_{PV}$ is the photovoltaic output, $P_W$ is the wind power output, $P_{buy}$ is the load, $P_{tank}^{ch}$ and $P_{tank}^{dis}$ are respectively a charging power and a discharging power of hydrogen energy storage, and $P_{bat}^{ch}$ and $P_{bat}^{dis}$ are respectively a charging power and a discharging power of a battery.

The photovoltaic output and wind power output constraints are:

$$0 \leq P_{PV} \leq P_{PVmax}$$

$$0 \leq P_W \leq P_{Wmax}$$

where $P_{PVmax}$ and $P_{Wmax}$ are respectively the predicted values of the maximum photovoltaic power and the maximum wind power.

In a possible implementation, the overall objective function is solved through a CPLEX solver.

In a second aspect, the disclosure provides a system for optimized scheduling of an integrated energy system. The integrated energy system includes wind energy, solar energy, and hydrogen energy. The system includes the following.

An indicator prediction module is used to respectively obtain marginal distribution functions of a unit electricity use consumption resource, a unit hydrogen energy harvesting resource, wind power, photovoltaic power, and load within a preset time period according to historical data; determine a first joint distribution function of the unit electricity use consumption resource and the unit hydrogen energy harvesting resource and a second joint distribution function of the wind power, the photovoltaic power, and the load based on the marginal distribution functions; and then predict a unit electricity use consumption resource, a unit hydrogen energy harvesting resource, the maximum wind power, the maximum photovoltaic power, and load within a preset time period based on the first joint distribution function and the second joint distribution function. Electricity use refers to use of electricity outside the integrated energy system, the hydrogen energy harvesting resource is obtained through transporting the hydrogen energy outward, and the load refers to electricity use amount.

A load adjustment module is used to adjust a predicted value of the load based on a dynamic change of the unit electricity use consumption resource within the preset time period to obtain a load value after performing a demand response based on the unit electricity use consumption resource to reduce a peak-valley difference of the load.

An objective function determination module is used to obtain a first objective function of a system operating consumption resource and a second objective function of an environmental consumption resource based on predicted values of the unit electricity use consumption resource, the unit hydrogen energy harvesting resource, the maximum wind power, and the maximum photovoltaic power and based on a load value of a unit electricity use consumption resource response. The first objective function includes an electricity use consumption resource, a penalty consumption resource for not using the wind energy and the solar energy, and a negative number of a resource harvested by converting the wind energy and the solar energy into the hydrogen energy. The second objective function includes a carbon emission consumption resource caused by electricity use.

An objective function solution module is used to weight and sum the first objective function and the second objective function to obtain an overall objective function, and then solve for the overall objective function to obtain an optimized scheduling result of the integrated energy system within the preset time period.

Specifically, for the specific step implementation of each module, reference may be made to the method described in the first aspect or any possible implementation of the first aspect, which will not be described in detail here.

In a third aspect, the disclosure provides an electronic apparatus, including: at least one memory, used to store a program; and at least one processor, used to execute the program stored in the memory. When the program stored in the memory is executed, the processor is used to execute the method according to the first aspect or any possible implementation manner of the first aspect.

In a fourth aspect, the disclosure provides a computer-readable storage medium. The computer-readable storage medium stores a computer program. When the computer program is run on a processor, the processor executes the method according to the first aspect or any possible implementation manner of the first aspect.

In a fifth aspect, the disclosure provides a computer program product. When the computer program product is run on a processor, the processor executes the method according to the first aspect or any possible implementation manner of the first aspect.

Generally speaking, compared with the prior art, the above technical solutions conceived by the disclosure has the following beneficial effects.

In the method and the system for optimized scheduling of the integrated energy system provided by the disclosure, different scenarios are divided according to time periods, and a joint probability distribution function of the wind power output, the photovoltaic output, and the load is established by adopting the three-dimensional Frank Copula function, while considering the uncertainty and correlation of source and load, which is not only important for power grid planning and operation control, but also help reduce the wind abandonment rate and the solar abandonment rate to improve the consumptive level of the wind power and photovoltaics. The disclosure establishes a joint probability distribution function of the electricity price and the hydrogen price by adopting the two-dimensional Frank Copula function, which fully considers the uncertainty and correlation of the electricity price and the hydrogen price, reflects the close connection between the electricity price and the hydrogen price currently, and is of great significance for deepening the coupling between the electricity market and the hydrogen energy market.

In the method and the system for optimized scheduling of the integrated energy system provided by the disclosure, the load is adjusted according to the demand response based on the electricity price, and the peak-valley difference of the load is reduced, which can reduce the operating cost of the system. Furthermore, the disclosure also considers the operating cost and environmental cost of the system at the same time, constructs a dual-objective optimized scheduling model, then converts the dual-objective model into a single-objective model, solves for the single-objective model, determines the optimized operating strategy of each part of the system, and verifies the economic efficiency and effectiveness of the proposed model.

BRIEF DESCRIPTION OF THE DRAWINGS

FIG. 1 is a flowchart of a method for optimized scheduling of an integrated energy system provided by an embodiment of the disclosure.

FIG. 2 is a schematic flowchart of a method for optimized scheduling of an integrated energy system considering electricity-hydrogen price correlation provided by an embodiment of the disclosure.

FIG. 3A is a schematic diagram of a wind power output on a typical day in the transition season provided by an embodiment of the disclosure.

DESCRIPTION OF THE EMBODIMENTS

Figure 3B:
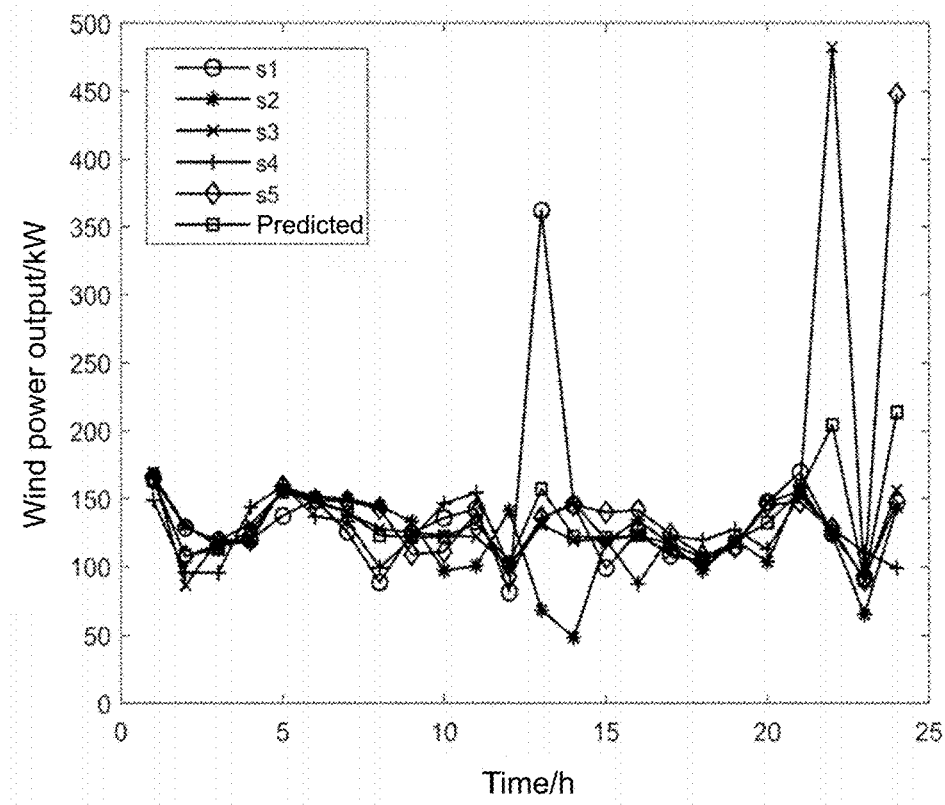
FIG. 3B is a schematic diagram of a wind power output on a typical day in summer provided by an embodiment of the disclosure.
Figure 3C:
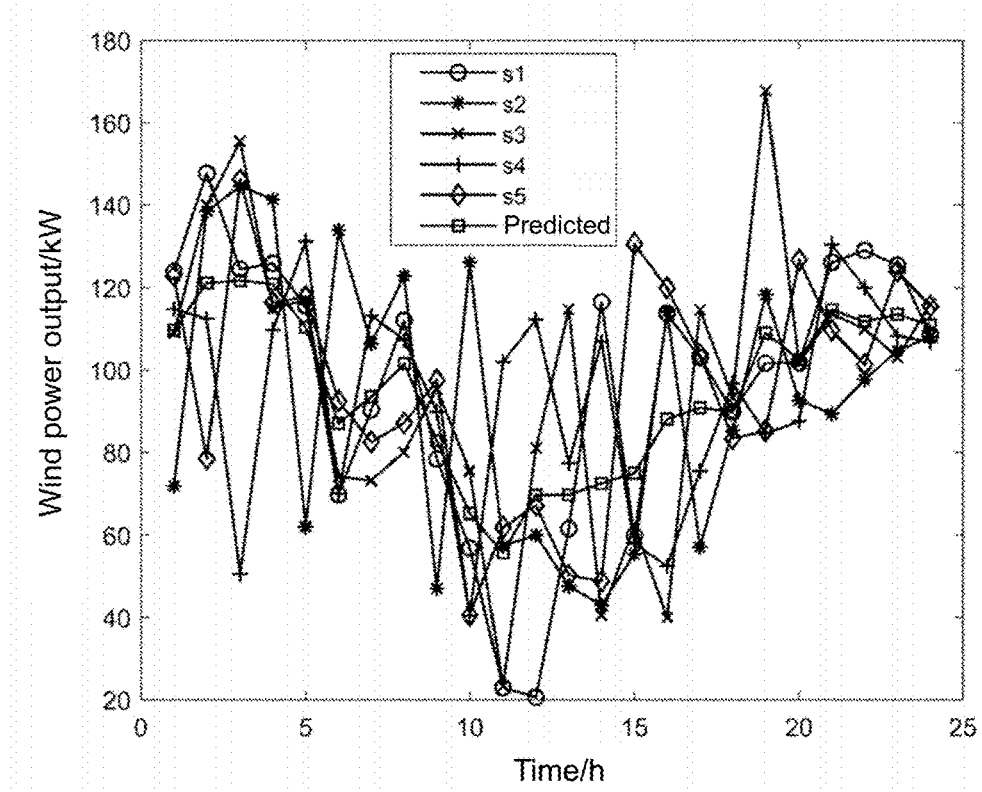
FIG. 3C is a schematic diagram of a wind power output on a typical day in winter provided by an embodiment of the disclosure.
Figure 4A:
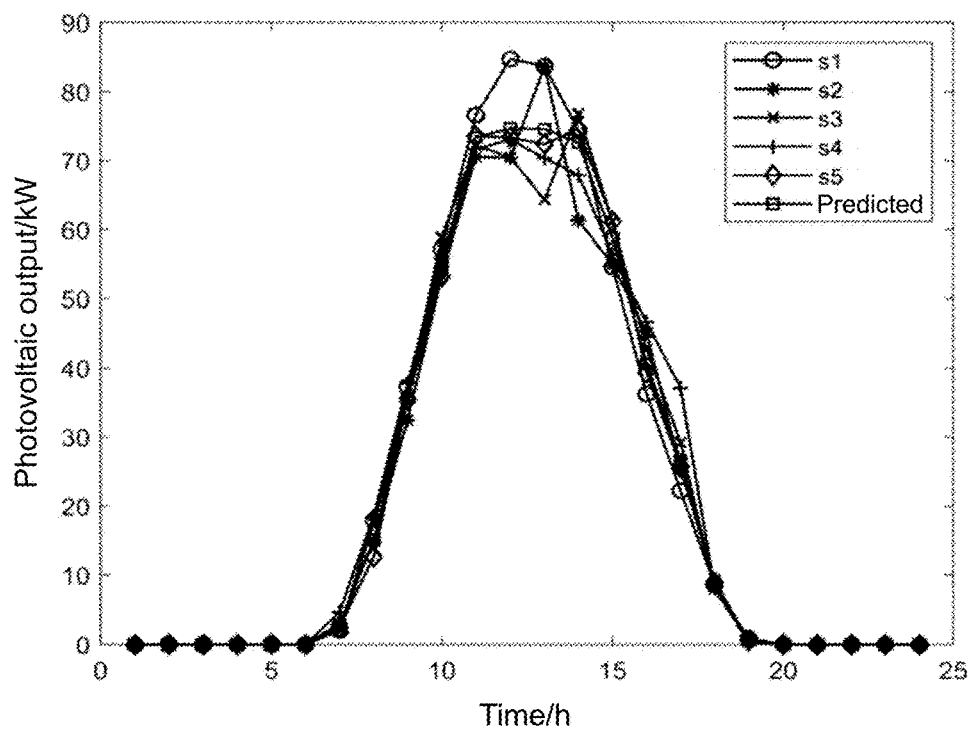
FIG. 4A is a schematic diagram of a photovoltaic output on a typical day in the transition season provided by an embodiment of the disclosure.
Figure 4B:
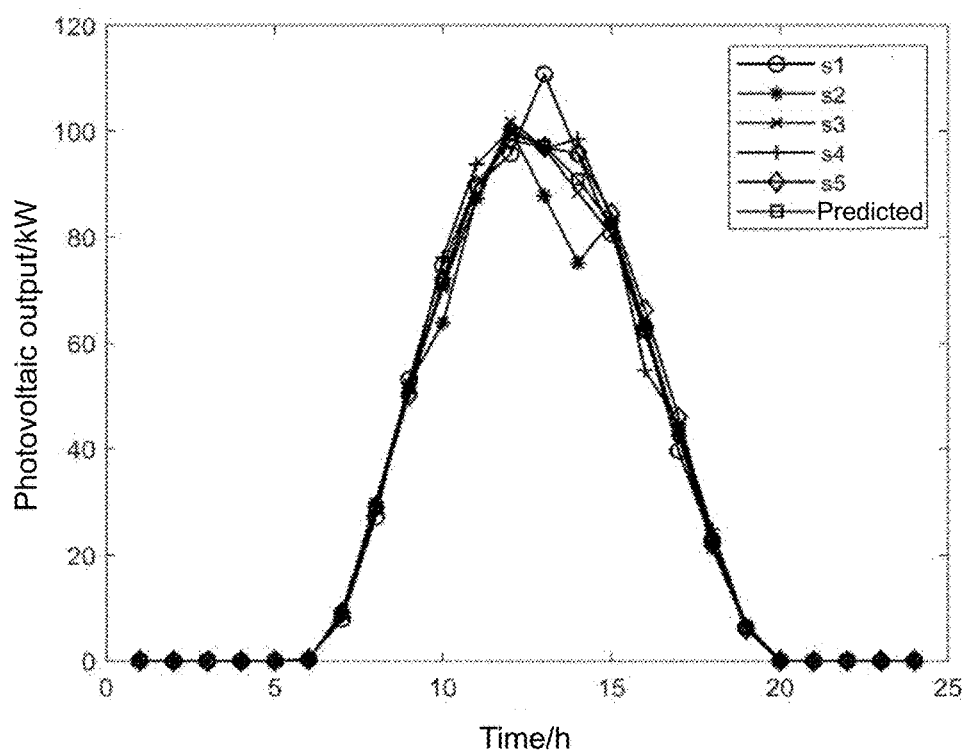
FIG. 4B is a schematic diagram of a photovoltaic output on a typical day in summer provided by an embodiment of the disclosure.
Figure 4C:
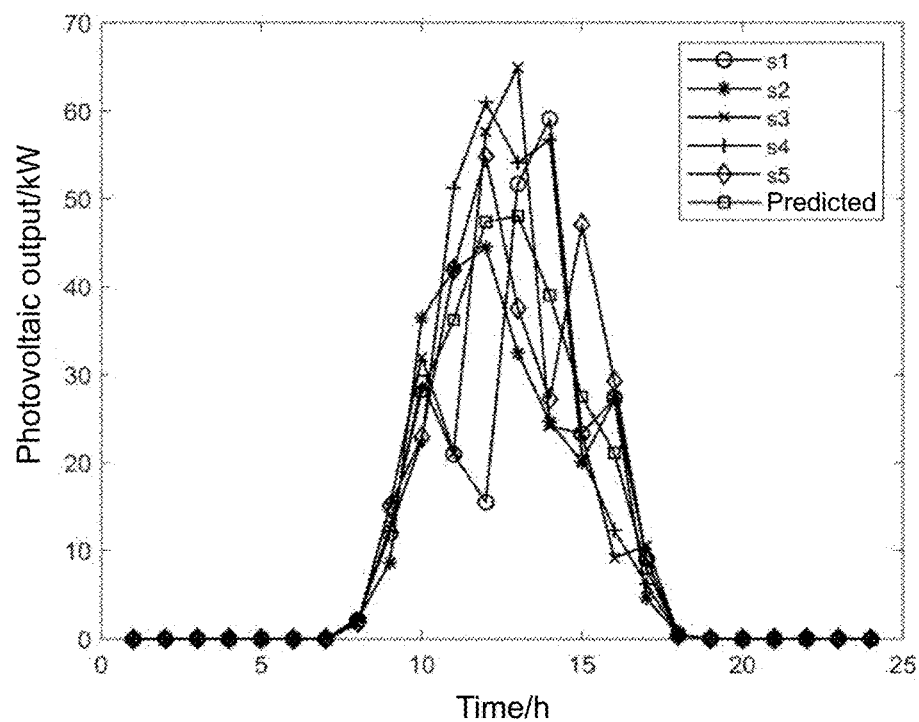
FIG. 4C is a schematic diagram of a photovoltaic output on a typical day in winter provided by an embodiment of the disclosure.
Figure 5A:
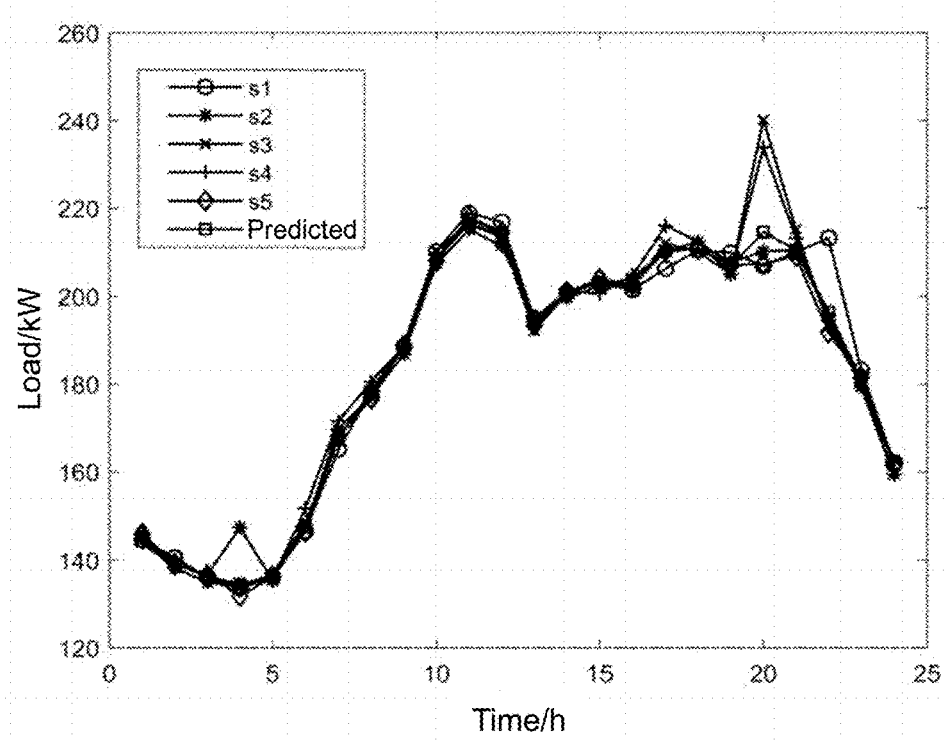
FIG. 5A is a schematic diagram of a load on a typical day in the transition season provided by an embodiment of the disclosure.
Figure 5B:
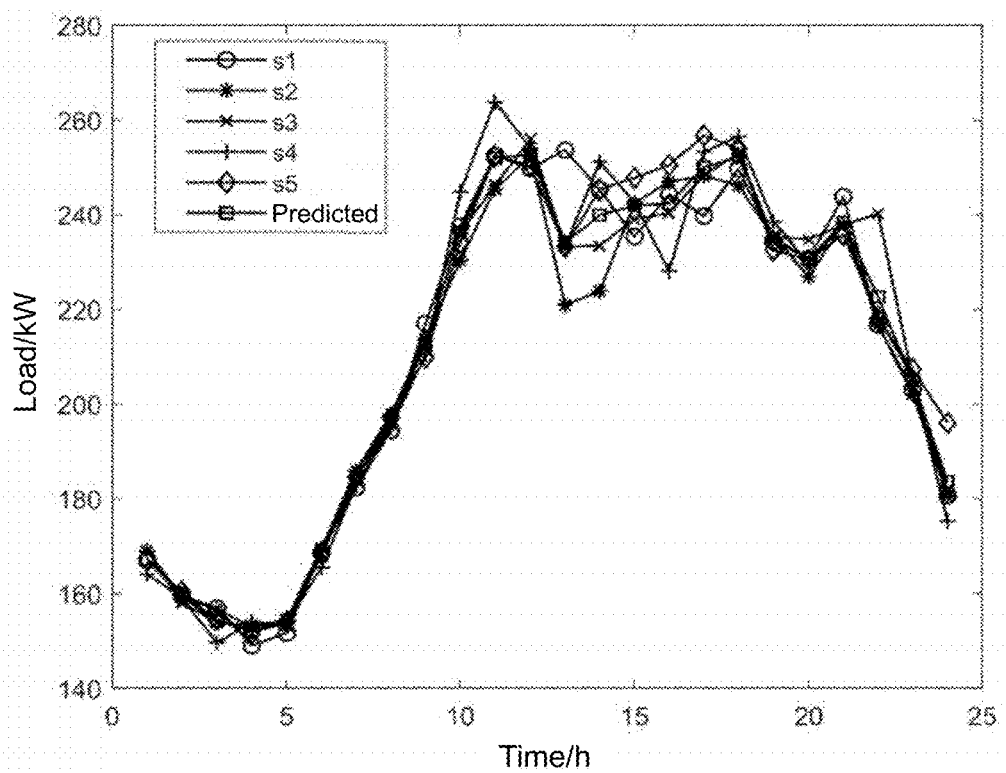
FIG. 5B is a schematic diagram of a load on a typical day in summer provided by an embodiment of the disclosure.
Figure 5C:
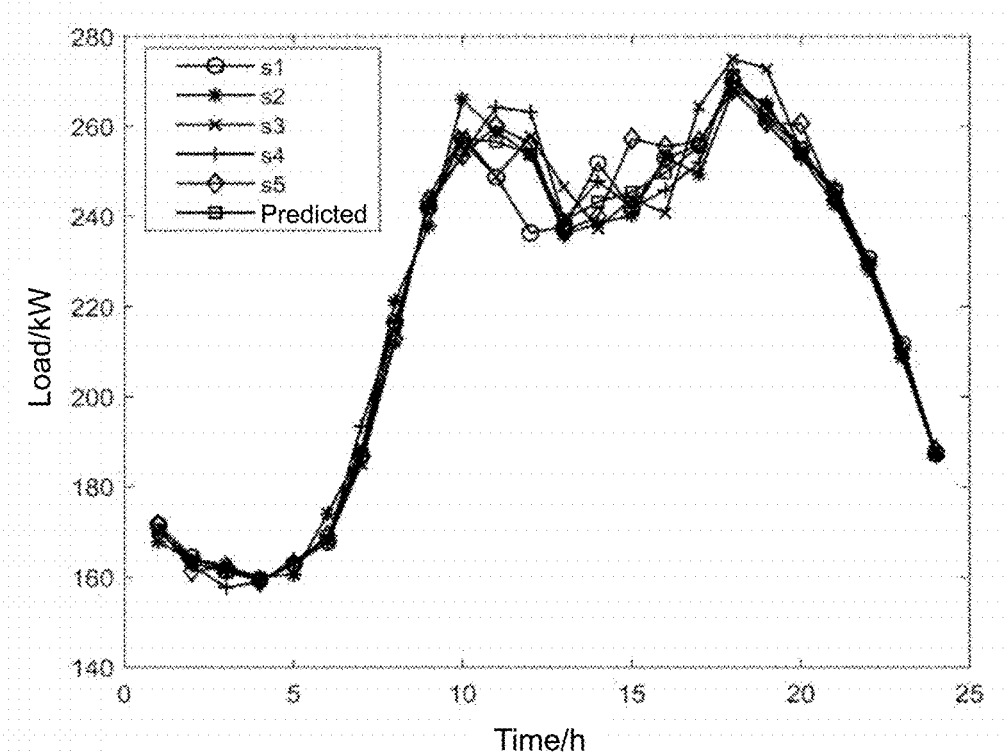
FIG. 5C is a schematic diagram of a load on a typical day in winter provided by an embodiment of the disclosure.
Figure 6A:
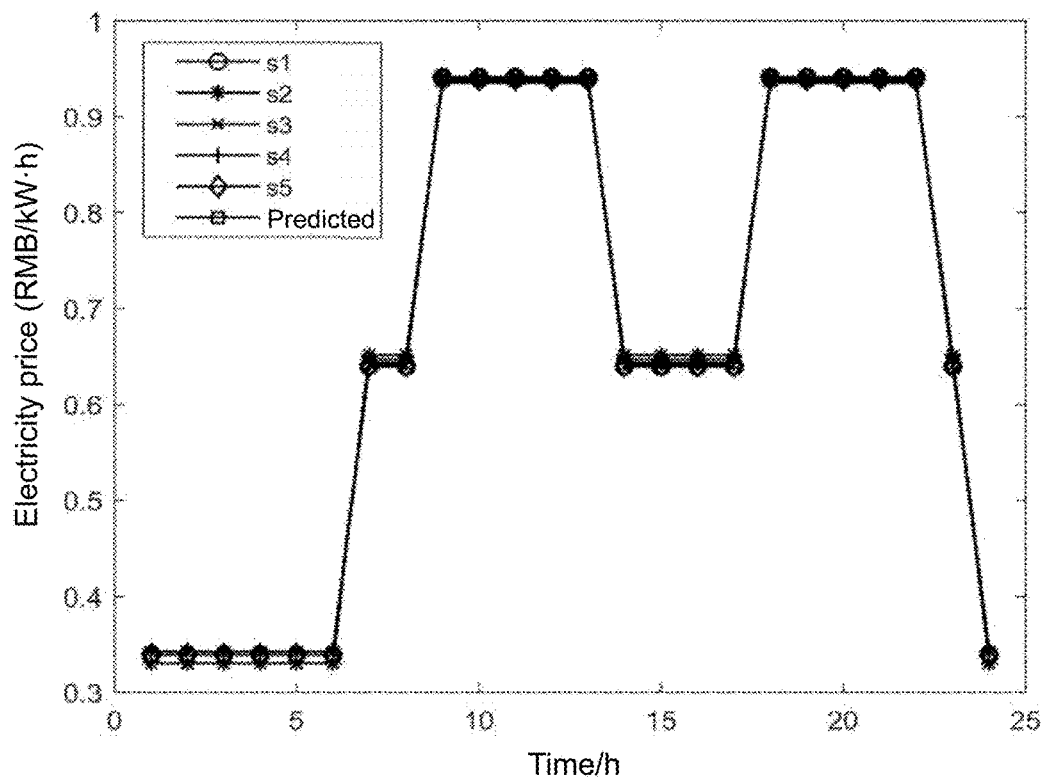
FIG. 6A is a schematic diagram of electricity price in the transition season provided by an embodiment of the disclosure.
Figure 6B:
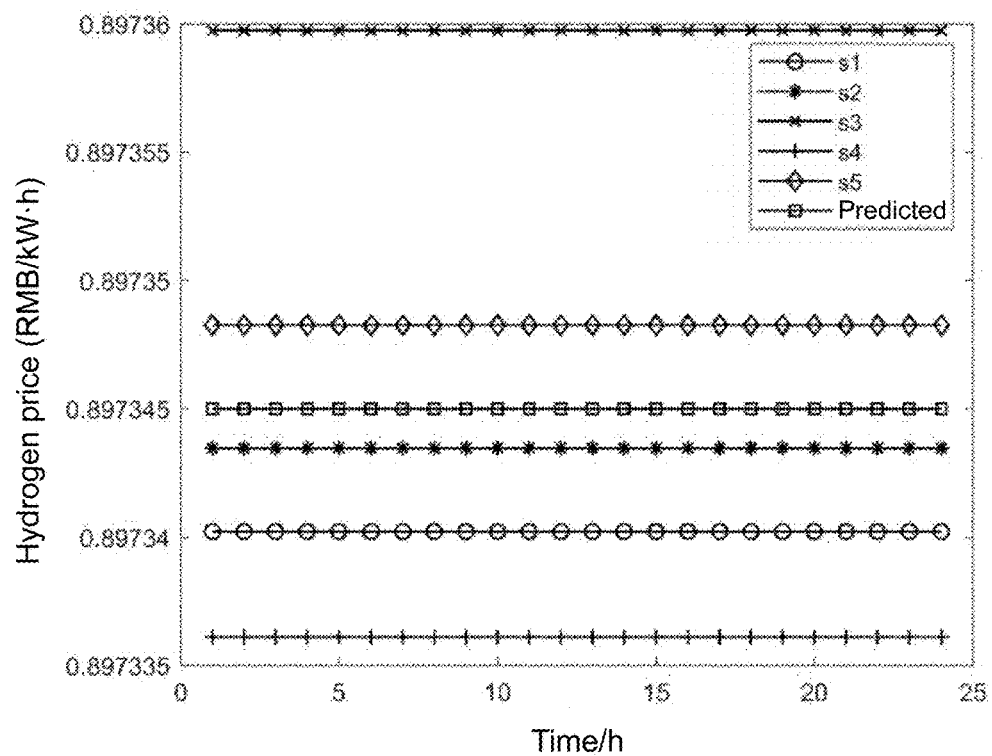
FIG. 6B is a schematic diagram of hydrogen price in the transition season provided by an embodiment of the disclosure.
Figure 7A:
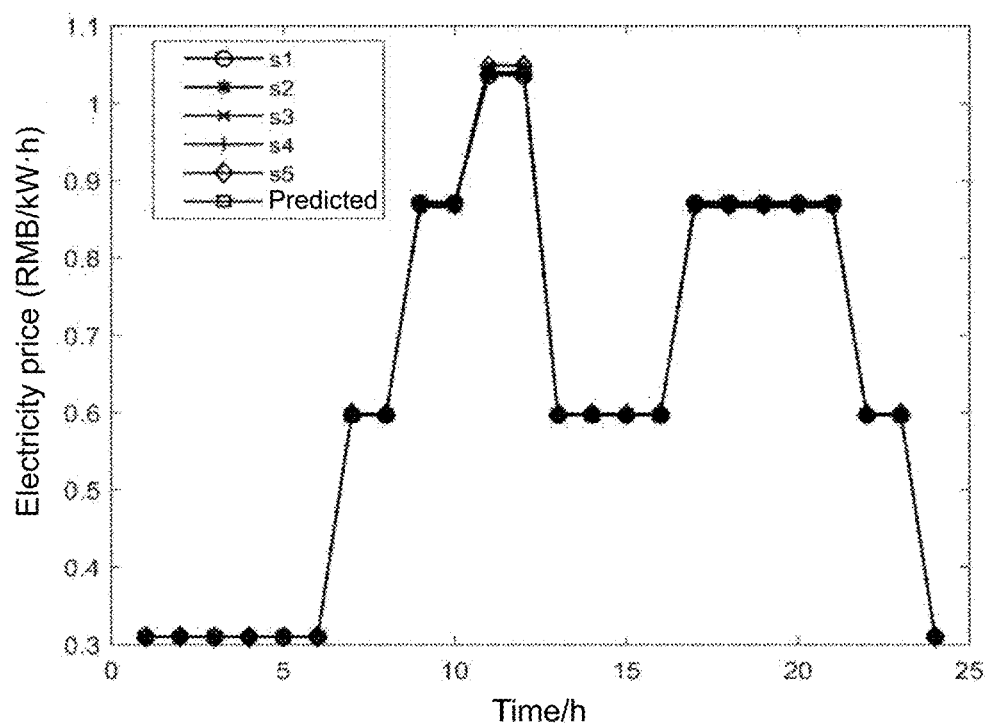
FIG. 7A is a schematic diagram of electricity price in summer provided by an embodiment of the disclosure.
Figure 7B:
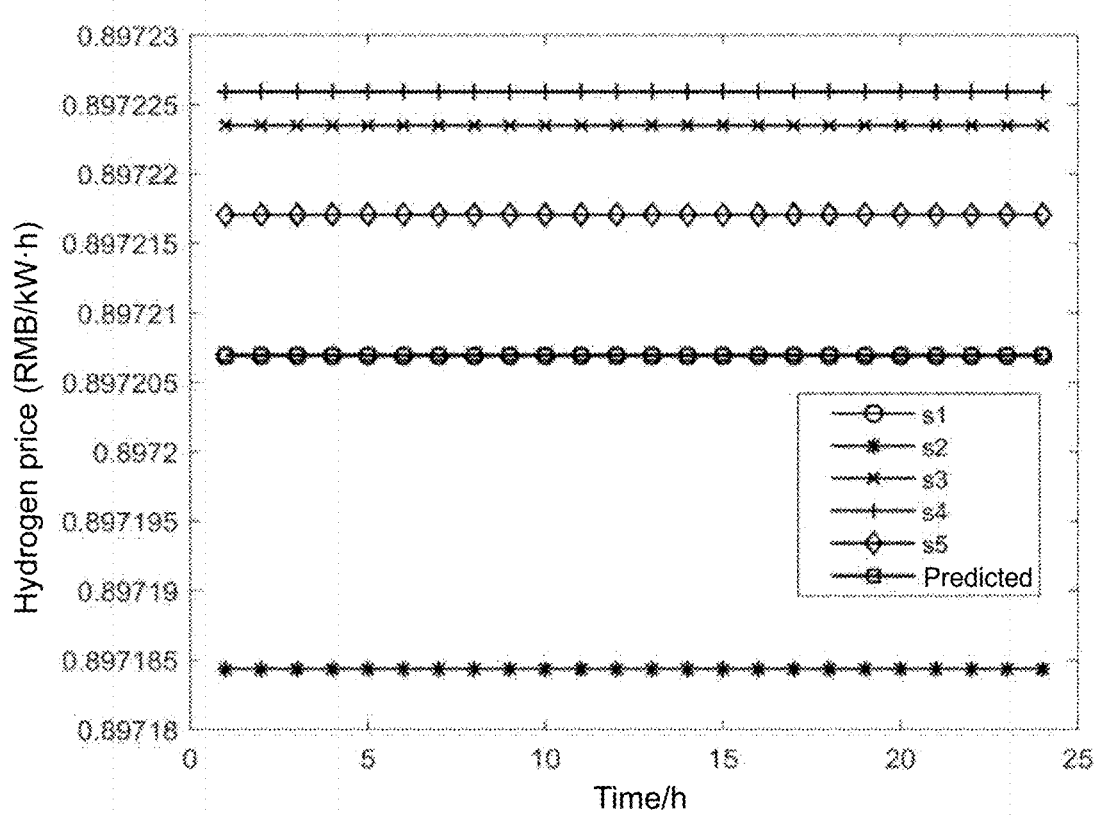
FIG. 7B is a schematic diagram of hydrogen price in summer provided by an embodiment of the disclosure.
Figure 8A:
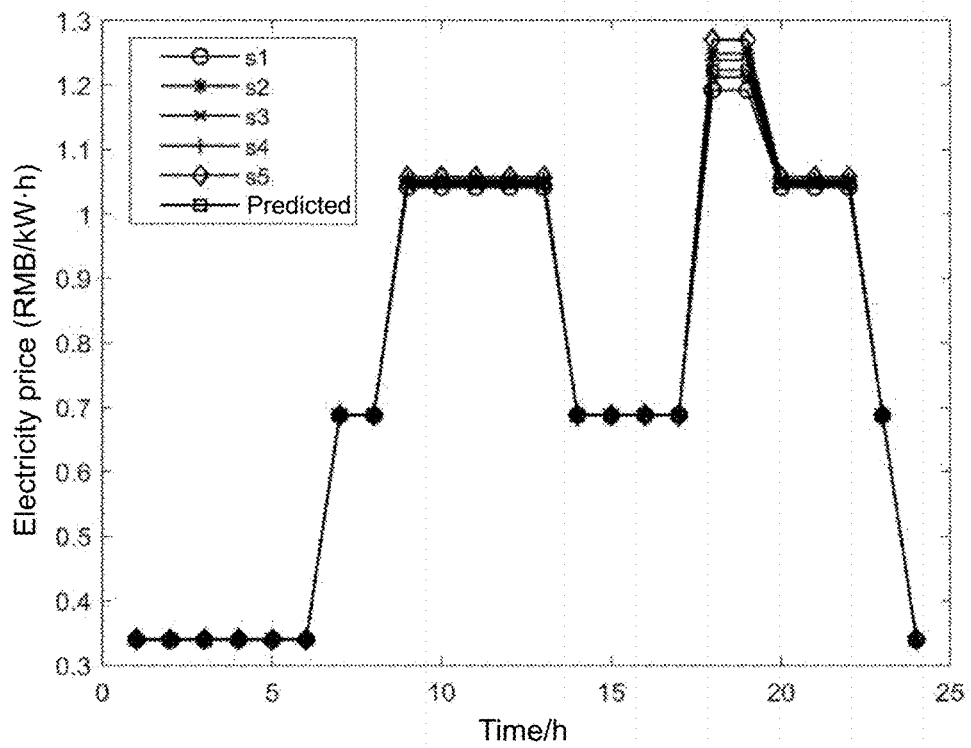
FIG. 8A is a schematic diagram of electricity price in winter provided by an embodiment of the disclosure.
Figure 8B:
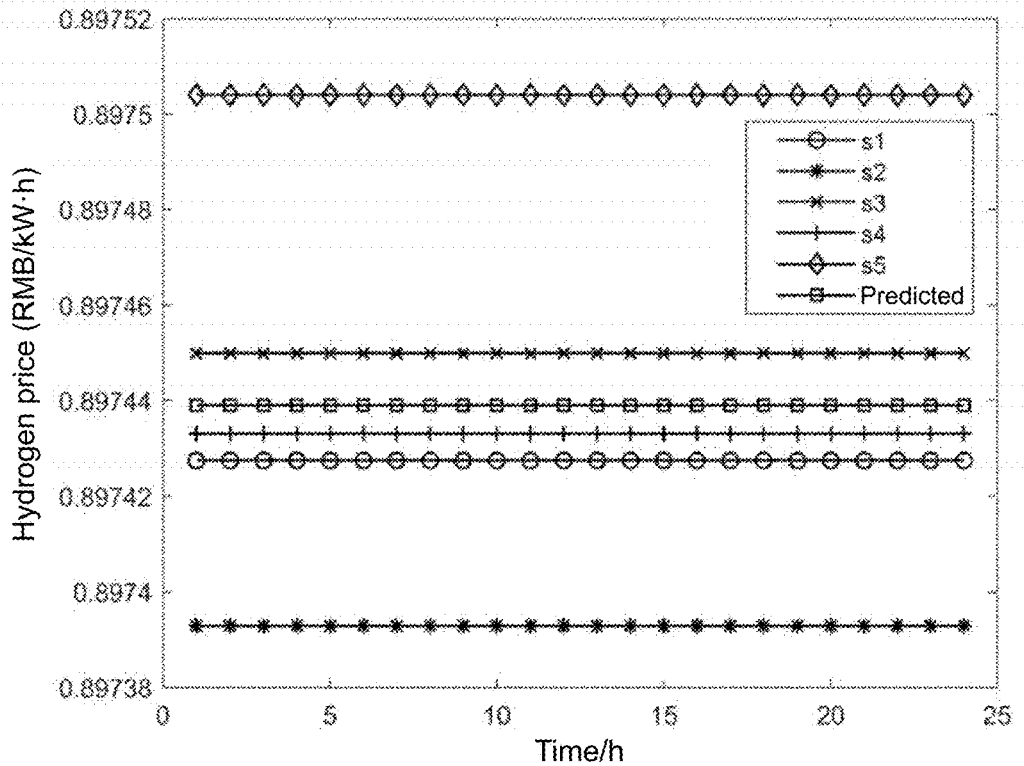
FIG. 8B is a schematic diagram of hydrogen price in winter provided by an embodiment of the disclosure.

In order for the objectives, technical solutions, and advantages of the disclosure to be clearer, the disclosure will be further described in detail below with reference to the drawings and the embodiments. It should be understood that the specific embodiments described here are only used to explain the disclosure and are not intended to limit the disclosure.

FIG. 1 is a flowchart of a method for optimized scheduling of an integrated energy system provided by an embodiment of the disclosure. As shown in FIG. 1, the method includes the following steps.

In S101, marginal distribution functions of a unit electricity use consumption resource, a unit hydrogen energy harvesting resource, a wind power, a photovoltaic power, and a load within a preset time period are respectively obtained according to historical data. A first joint distribution function of the unit electricity use consumption resource and the unit hydrogen energy harvesting resource and a second joint distribution function of the wind power, the photovoltaic power, and the load are determined based on the marginal distribution functions. A unit electricity use consumption resource, a unit hydrogen energy harvesting resource, the maximum wind power, the maximum photovoltaic power, and load within a preset time period are then predicted based on the first joint distribution function and the second joint distribution function. Electricity use refers to use of electricity outside the integrated energy system, the hydrogen energy harvesting resource is obtained through transporting the hydrogen energy outward, and the load refers to electricity use amount.

In S102, a predicted value of the load is adjusted based on a dynamic change of the unit electricity use consumption resource within the preset time period to obtain a load value after performing a demand response based on the unit electricity use consumption resource to reduce a peak-valley difference of the load.

In S103, a first objective function of a system operating consumption resource and a second objective function of an environmental consumption resource are obtained based on predicted values of the unit electricity use consumption resource, the unit hydrogen energy harvesting resource, the maximum wind power, and the maximum photovoltaic power and based on a load value of a unit electricity use consumption resource response. The first objective function includes an electricity use consumption resource, a penalty consumption resource for not using the wind energy and the solar energy, and a negative number of a resource harvested by converting the wind energy and the solar energy into the hydrogen energy. The second objective function includes a carbon emission consumption resource caused by electricity use.

In S104, the first objective function and the second objective function are weighted and summed to obtain an overall objective function, and the overall objective function is then solved to obtain an optimized scheduling result of the integrated energy system within the preset time period.

In a specific embodiment, the disclosure provides a method for optimized scheduling of an integrated energy system considering electricity-hydrogen price correlation. As shown in FIG. 2, the method specifically includes the following steps.

In step 1, correlation of wind power generation, photovoltaic power generation, and the load and correlation of electricity price and hydrogen price are modelled by adopting a Copula function, and a typical scenario of each season (the transition season, summer, and winter) is generated.

In step 1.1, marginal distributions of the electricity price, the hydrogen price, the wind power, the photovoltaic power, and the load are estimated by adopting a non-parametric kernel density estimation method to the Kernel density estimation is a non-parametric estimation method. It is assumed that an independent and identically distributed sample extracted from X is $X_1, X_2, \ldots, X_n$, f (x) is a corresponding density function and is an unknown function, $x \in R$, and a probability density function estimated value $\hat{f}(x)$ at a point x needs to be calculated, which is:

$$\hat{f}(x) = \frac{1}{nh}\sum_{i=1}^{n} K\left(\frac{x-X_i}{h}\right)$$

where n is a sample number, h is a window width, and K(·) is a kernel function adopted in a kernel density estimation method.

In step 1.2, a joint distribution function of the electricity price and the hydrogen price is generated using a two-dimensional Frank Copula function, and a joint distribution of the wind power, the photovoltaic power, and the load is generated using a three-dimensional Frank Copula function. An expression of the Copula function is:

$$F(x_1, x_2, \ldots, x_n) = C(\hat{f}_{x_1}(x_1), \hat{f}_{x_2}(x_2), \ldots \hat{f}_{x_n}(x_n))$$

where n is the number of variables, $\hat{f}_{x_i}(x_i)$ (i=1, 2, ..., n) is a marginal distribution function of a single variable, C(·) is a Copula link function, and $F(x_1, x_2, \ldots, x_n)$ is a joint distribution function of n variables.

When describing the correlation between the electricity price and the hydrogen price, C(·) may be expressed as:

$$C(v_1, v_2, \theta_1) = -\frac{1}{\theta_1}\ln\left[1 + \frac{(\exp(-\theta_1 v_1)-1)(\exp(-\theta_1 v_2)-1)}{\exp(-\theta_1)-1}\right]$$

where $v_1$ and $v_2$ are respectively the marginal distribution functions of the electricity price and the hydrogen price, and $\theta_1$ is a parameter of the two-dimensional Frank Copula function and is estimated by adopting a maximum likelihood method.

When describing the correlation of the wind power, the photovoltaic power, and the load, C(·) may be expressed as:

$$C(u_1, u_2, u_3) = -\frac{1}{\theta_2}\ln\left[1 + \frac{(\exp(-\theta_2 u_1)-1)(\exp(-\theta_2 u_2)-1)(\exp(-\theta_2 u_3)-1)}{[\exp(-\theta_2)-1]^2}\right]$$

where $u_1$, $u_2$, and $u_3$ respectively represent the marginal distribution functions of the wind power, the photovoltaic power, and the load, and $\theta_2$ is a parameter of the three-dimensional Frank Copula function and is estimated by the maximum likelihood method.

In step 1.3, a joint probability distribution function is sampled, and a sampling result and the joint probability distribution function are inversely transformed to obtain scenario data of the electricity price, the hydrogen price, the wind power, the photovoltaic power, and the load corresponding to each time period.

In step 2, a user-side price-based demand response is introduced, and a user is encouraged to adjust an electricity use load using a seasonal critical peak price.

The price-based demand response includes the following content.

Electricity price elasticity is usually used to quantify a price response of a user. The electricity price elasticity refers to a relative change in electricity use amount caused by a relative change in the electricity price. The electricity use amount of the electricity user during a certain time period is not only related to the electricity price of that time period, but also affected by the electricity prices during other time periods, which are respectively described by a self-elasticity coefficient and a cross-elasticity coefficient.

$$e_{ij} = \frac{\Delta q_i}{q_{oi}} \bigg/ \frac{\Delta p_j}{p_{j0}}$$

where $\Delta q_i$ is a load change before and after the demand response, $\Delta q_i = q_i - q_{0i}$, $q_i$ is the load after an i-th time period demand response, $q_{0i}$ is the predicted value of the load before the i-th time period demand response, $\Delta p_j$ is an increment of the electricity price before and after a j-th time period demand response, $\Delta p_j = p_j - p_{j0}$, j=1, 2, ..., m, $p_{j0}$ is the electricity price before the j-th time period demand response, which refers to the usual electricity price, and $p_j$ is the electricity price after the j-th time period demand response, which refers to the time-of-use electricity price and is a predicted electricity price.

An available electricity price elasticity matrix describes the price response of the user during multiple time periods:

$$\begin{bmatrix} q_1 \\ q_2 \\ \vdots \\ q_m \end{bmatrix} = \begin{bmatrix} q_{01} \\ q_{02} \\ \vdots \\ q_{0m} \end{bmatrix} + \begin{bmatrix} q_{01} & \cdots & \cdots & 0 \\ \vdots & q_{02} & \cdots & \vdots \\ \vdots & \vdots & \ddots & \vdots \\ 0 & \cdots & \cdots & q_{0m} \end{bmatrix} E \begin{bmatrix} \Delta p_1 / p_{10} \\ \Delta p_2 / p_{20} \\ \vdots \\ \Delta p_m / p_{m0} \end{bmatrix}$$

where $\Delta p_j$ is the increment of the electricity price, $\Delta p_j = p_j - p_{j0}$, j=1, 2, ..., m, m is the time period, and E is an electricity price elasticity matrix.

$$E = \begin{bmatrix} e_{11} & e_{12} & \cdots & e_{1m} \\ e_{21} & e_{22} & \cdots & e_{2m} \\ \vdots & \vdots & & \vdots \\ e_{m1} & e_{m2} & \cdots & e_{mm} \end{bmatrix}$$

where $e_{ii}$ and $e_{ij}$ are respectively the self-elasticity coefficient and the cross-elasticity coefficient.

Figure 9A:
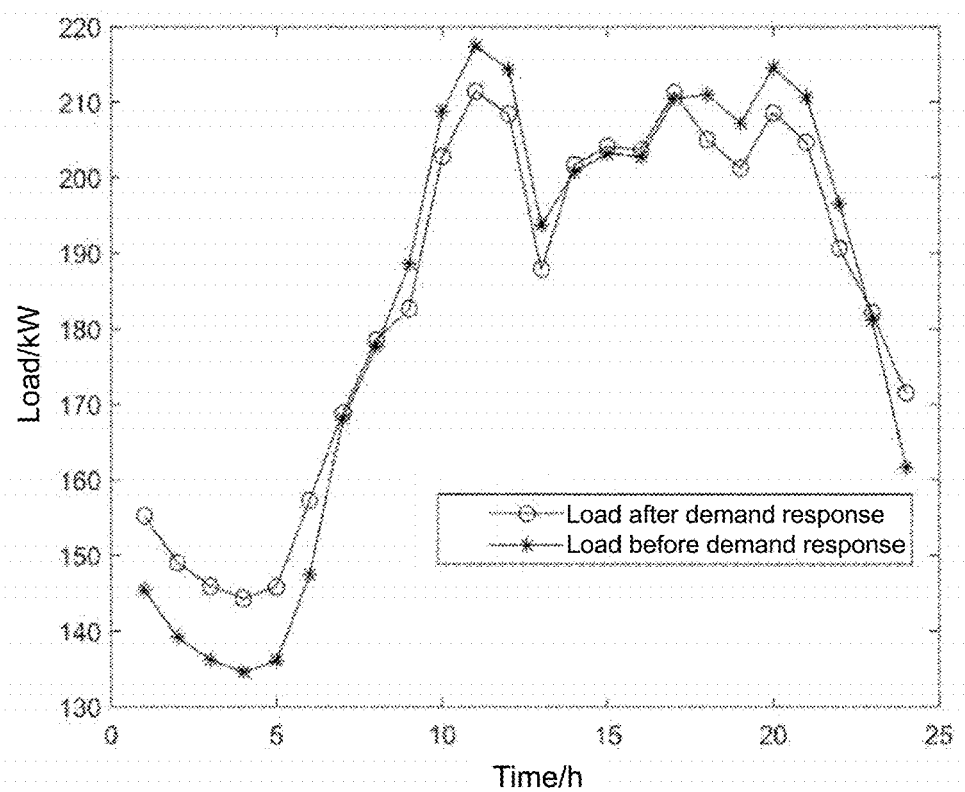
FIG. 9A is a comparison schematic diagram of load curves before and after considering a user-side demand response in the transition season provided by an embodiment of the disclosure.
Figure 9B:
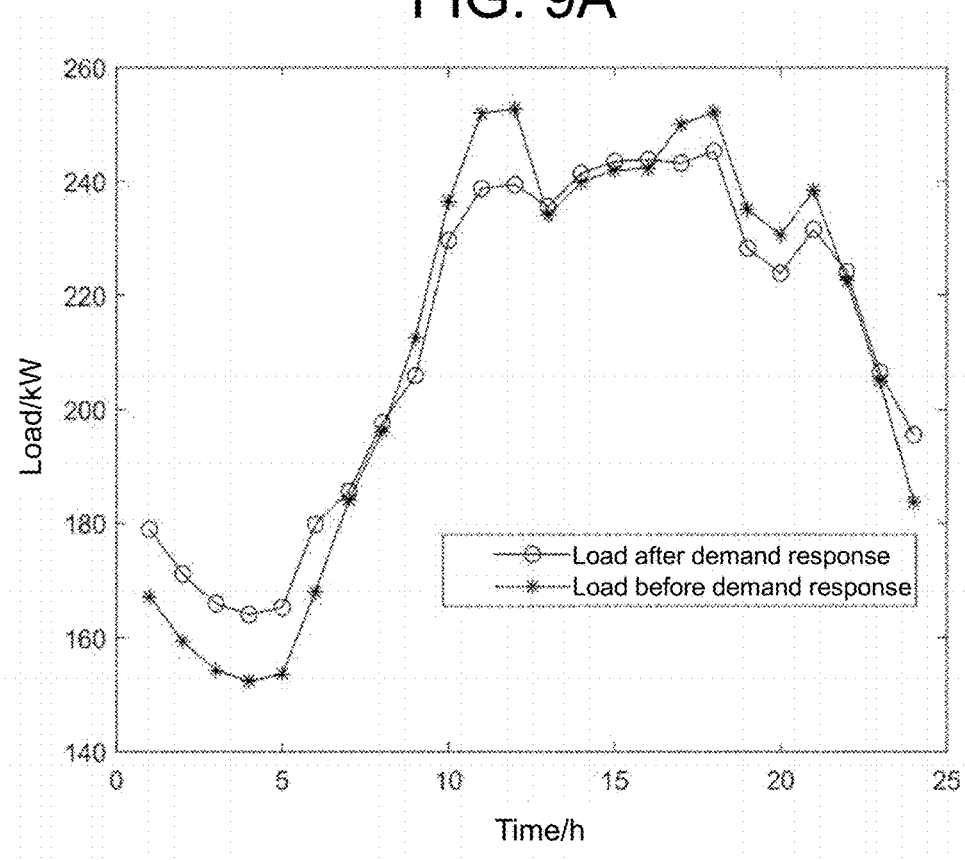
FIG. 9B is a comparison schematic diagram of load curves before and after considering a user-side demand response in summer according to an embodiment of the disclosure.
Figure 9C:
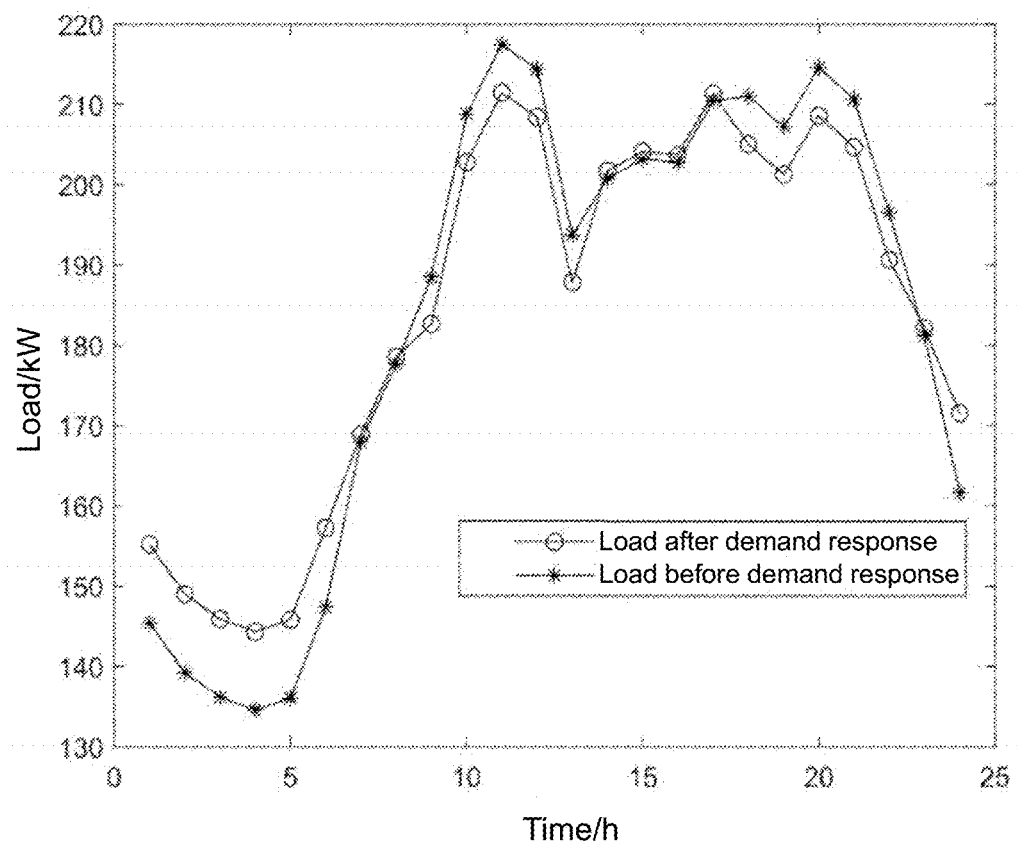
FIG. 9C is a comparison schematic diagram of load curves before and after considering a user-side demand response in winter provided by an embodiment of the disclosure.
Figure 10A:
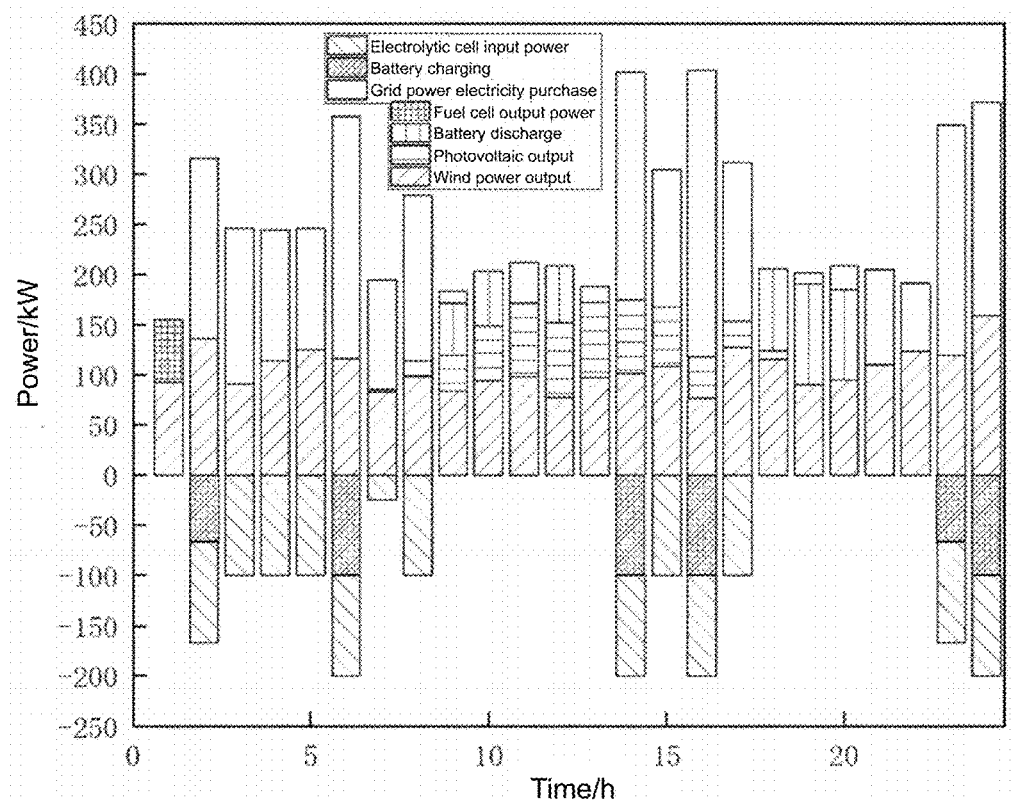
FIG. 10A is a schematic diagram of an output situation of a system when considering electricity-hydrogen price correlation in the transition season provided by an embodiment of the disclosure.
Figure 10B:
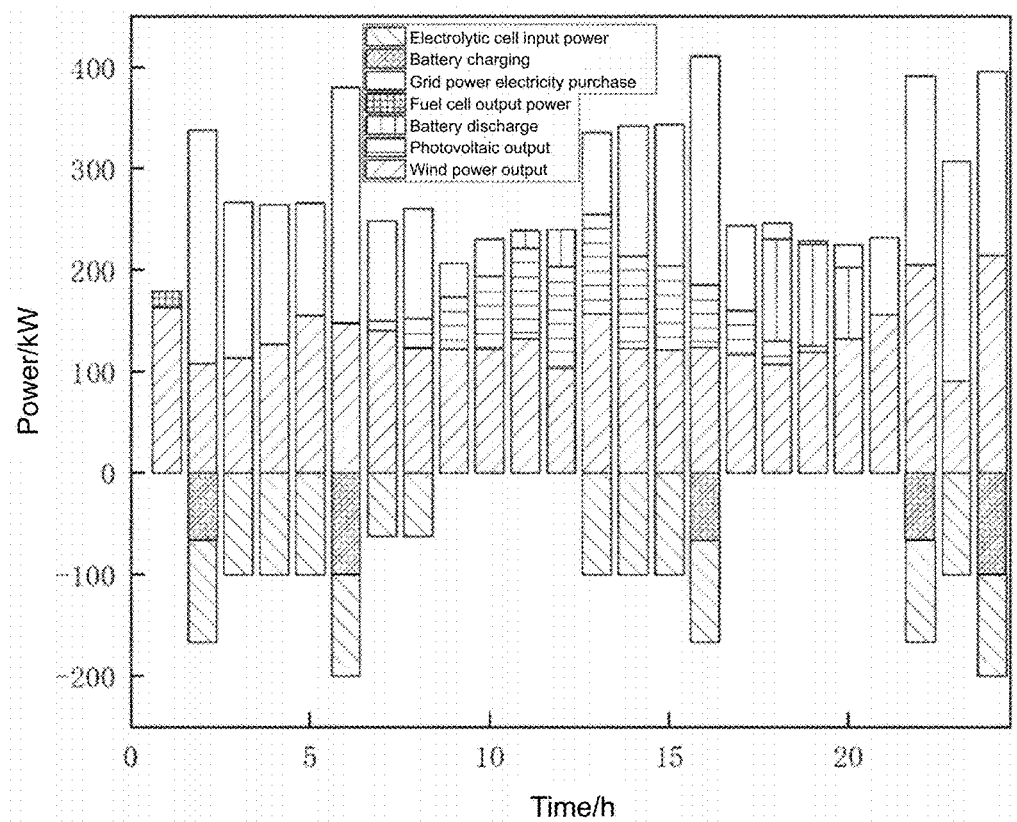
FIG. 10B is a schematic diagram of an output situation of a system when considering electricity-hydrogen price correlation in summer provided by an embodiment of the disclosure.
Figure 10C:
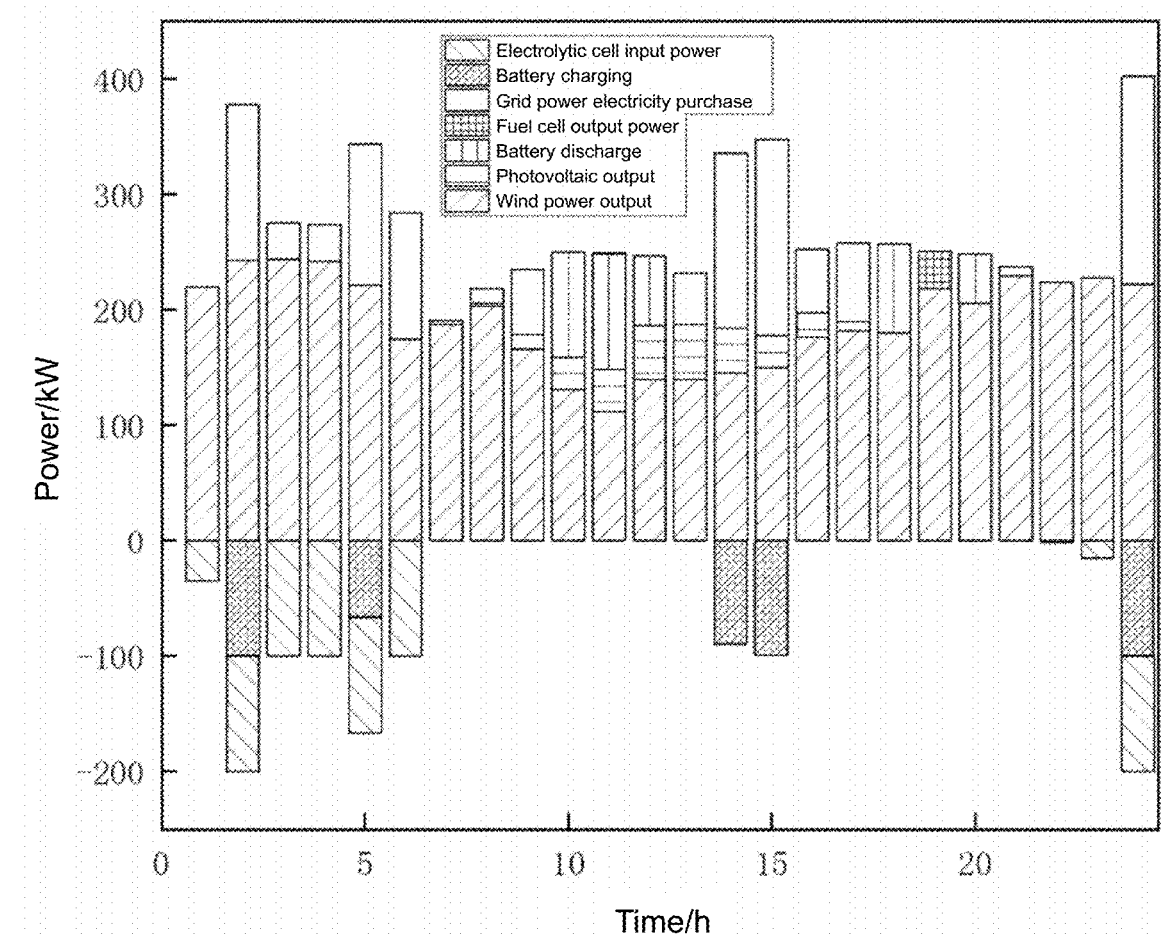
FIG. 10C is a schematic diagram of an output situation of a system when considering electricity-hydrogen price correlation in winter provided by an embodiment of the disclosure.
Figure 11A:
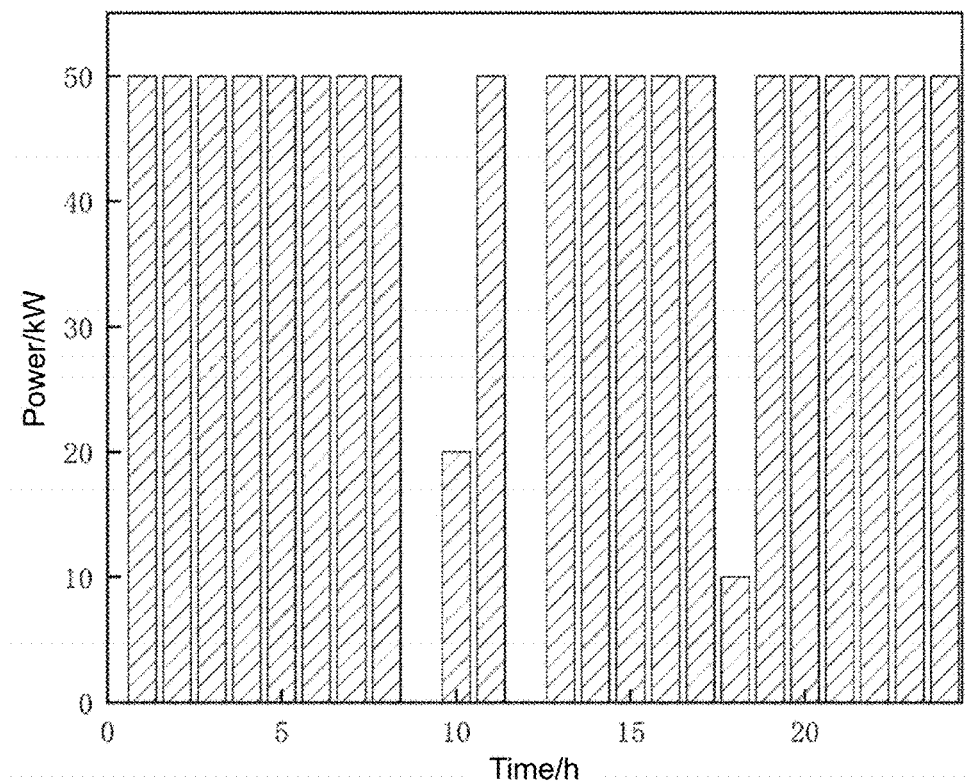
FIG. 11A is a schematic diagram of a hydrogen sales situation of a system when considering electricity-hydrogen price correlation in the transition season provided by an embodiment of the disclosure.
Figure 11B:
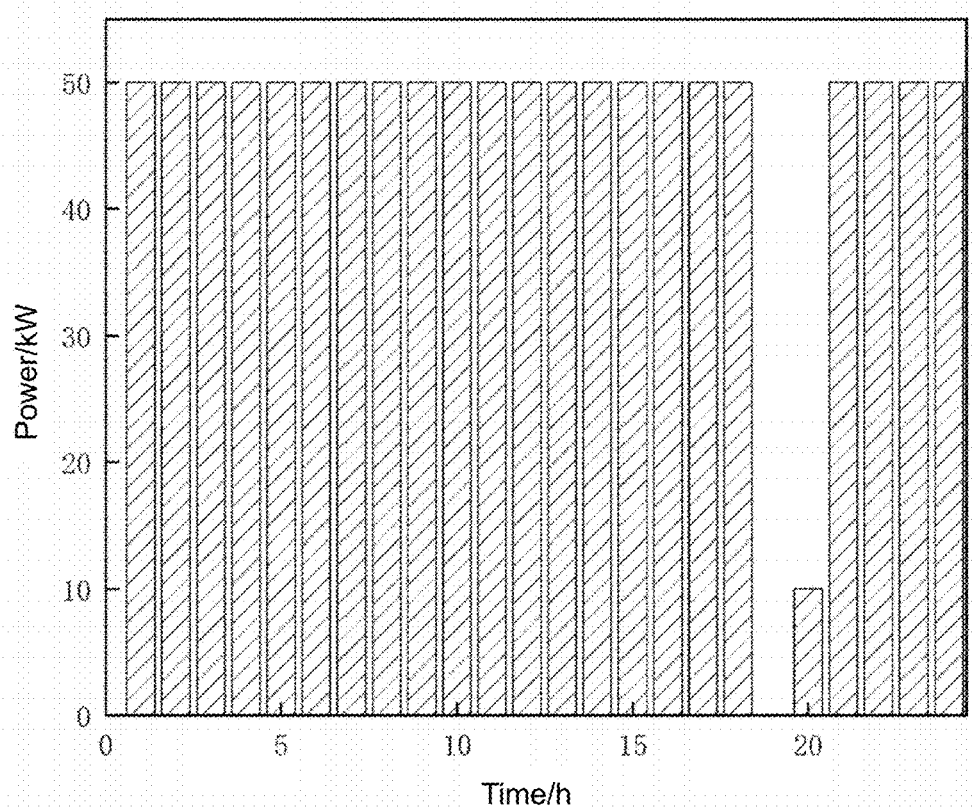
FIG. 11B is a schematic diagram of a hydrogen sales situation of a system when considering electricity-hydrogen price correlation in summer provided by an embodiment of the disclosure.
Figure 11C:
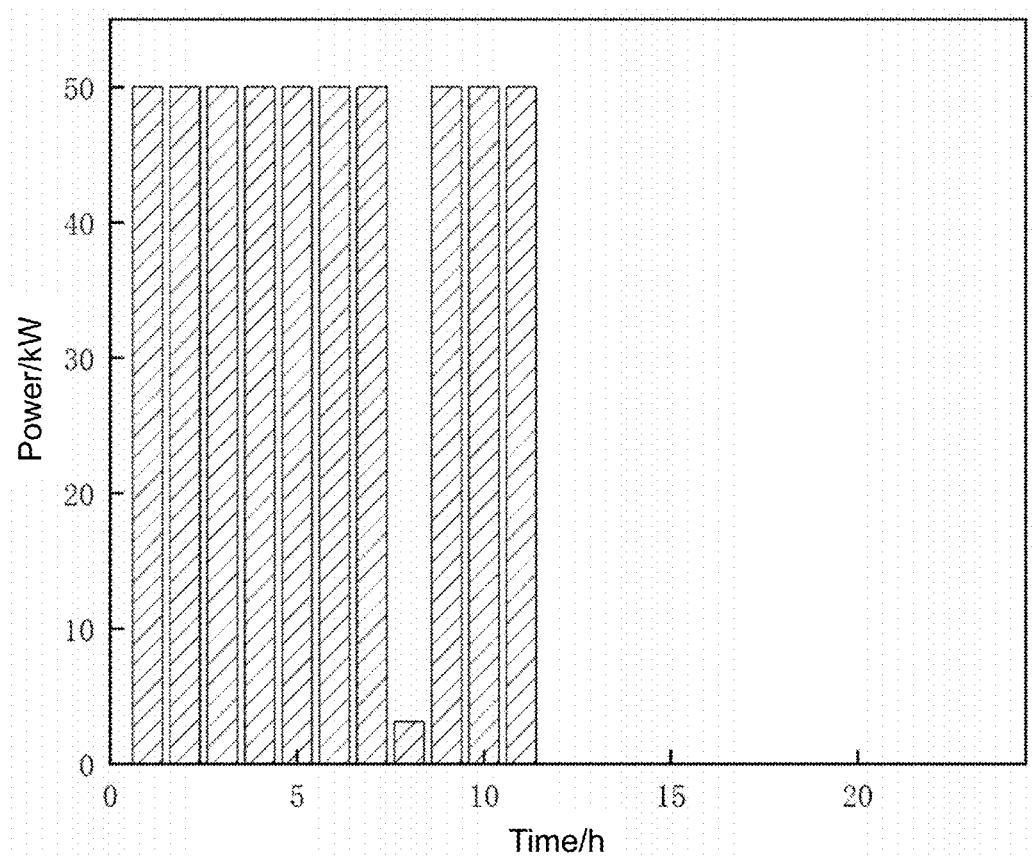
FIG. 11C is a schematic diagram of a hydrogen sales situation of a system when considering electricity-hydrogen price correlation in winter provided by an embodiment of the disclosure.

In step 3, data of the load, the wind power generation, the photovoltaic output, the electricity price, and the hydrogen price of one year in a certain area is selected, a total of 5 scenarios s1 to s5 in FIG. 3A to FIG. 9C are generated using the non-parametric kernel density estimation method and a Frank Copula function scenario generation method and scenario reduction method, and the corresponding predicted values are finally obtained. The wind power outputs on typical days in the transition season, summer, and winter obtained in step 1 are respectively shown in FIG. 3A, FIG. 3B, and FIG. 3C, the photovoltaic outputs are respectively shown in FIG. 4A, FIG. 4B, and FIG. 4C, the loads are respectively shown in FIG. 5A, FIG. 5B, and FIG. 5C, the data of the electricity price and the hydrogen price in the transition season are respectively shown in FIG. 6A and FIG. 6B, the data of the electricity price and the hydrogen price in summer are respectively shown in FIG. 7A and FIG. 7B, the data of the electricity price and the hydrogen price in winter are respectively shown in FIG. 8A and FIG. 8B, and the data of the load on typical days in the three seasons considering the demand response in step 2 obtained using the data of the electricity price and the load obtained in step 1 are respectively as shown in FIG. 9A, FIG. 9B, and FIG. 9C. The data of wind and photovoltaic outputs and the data of the electricity price and the hydrogen price obtained in step 1 and the data of the load considering the demand response obtained in step 2 are used as input parameters to establish a multi-objective optimized scheduling model considering economic efficiency and environmental protection at the same time.

Objective 1 is to minimize the operating cost of the system. The operating cost of the system is a penalty cost for wind abandonment and solar abandonment and a difference value between an electricity purchase cost of the system and a hydrogen sales revenue. Objective 2 is to minimize an environmental cost. The environmental cost is carbon dioxide emission caused by purchasing electricity from the power grid. Since the revenue from selling hydrogen is higher, reducing the operating cost of the system sometimes requires purchasing electricity from the power grid to make an electrolytic cell work at the highest power possible, which runs counter to the low-carbon objective, resulting in two conflicting optimization objectives.

Calculation of the operating cost of the system is as follows:

$$F_1 = \min(f_{buy} + f_{dis} - f_{sell,H})$$

where $F_1$ is the operating cost of the system, $f_{buy}$ is the electricity purchase cost of the system, $f_{dis}$ is the penalty cost for wind abandonment and solar abandonment of the system, and $f_{sell,H}$ is a hydrogen sales income.

1) Electricity Purchase Cost $$f_{buy} = \sum_{t=1}^{T} \beta_t P_{buy}(t)$$

where $\beta_t$ is the electricity price during the time period t and $P_{buy}(t)$ is a electricity purchase amount during the time period t.

2) Penalty Cost for Wind Abandonment and Solar Abandonment $$f_{dis} = \omega \sum_{t=1}^{T} [P_{W,dis}(t) + P_{PV,dis}(t)]$$

where $\omega$ is a unit penalty cost for wind abandonment and solar abandonment, and $P_{W,dis}(t)$ and $P_{PV,dis}(t)$ are respectively the wind abandonment power and the solar abandonment power during the time period t.

3) Hydrogen Sales Income $$f_{sell,H} = \sum_{t=1}^{T} \alpha_t H_{sell}(t)$$

where $\alpha_t$ is a hydrogen sales price during the time period t and $H_{sell}(t)$ is a power of hydrogen sold to a hydrogen market for use in other industries during the time period t, that is, the power of transporting hydrogen outward.

Calculation of the environmental cost is as follows:

$$F_2 = \min f_{CO_2}$$

$$f_{CO_2} = \begin{cases} \lambda E_{IESt}, & E_{IESt} \leq l \\ \lambda l + \lambda(1+\alpha)(E_{IESt} - l), & l \leq E_{IESt} \leq 2l \\ \lambda(2+\alpha)l + \lambda(1+2\alpha)(E_{IESt} - 2l), & 2l \leq E_{IESt} \leq 3l \\ \lambda(3+3\alpha)l + \lambda(1+3\alpha)(E_{IESt} - 3l), & 3l \leq E_{IESt} \leq 4l \\ \lambda(4+6\alpha)l + \lambda(1+4\alpha)(E_{IESt} - 4l), & E_{IESt} \geq 4l \end{cases}$$

where $F_2$ is the environmental cost, $f_{CO_2}$ is a tiered carbon trading cost of the system, $\lambda$ is a basic price of carbon trading, l is an interval division length of carbon emission, $\alpha$ is a price growth rate, and $E_{IESt}$ is a carbon emission rights trading volume. Specific calculation formulae are as follows:

$$\begin{cases} E_{IESt} = E_{IESa} - E_{IES} \\ E_{IESa} = \chi_{ca} P_{buy} \\ E_{IES} = \chi_c P_{buy} \end{cases}$$

where $E_{IESa}$ is an actual carbon emission generated by the system, $E_{IES}$ is a total carbon emission volume allocated to the system for relevant sectors, $\chi_{ca}$ is a carbon emission generated by the system after purchasing a unit of electricity from the power grid, and $\chi_c$ is a free carbon emission quota obtained by the system after purchasing a unit of electricity from the power grid.

Constraints of the overall objective function include hydrogen energy storage system-related constraints, battery energy storage-related constraints, a power balance constraint, photovoltaic and wind turbine output constraints, etc.

The hydrogen energy storage system-related constraints are:

$$E_{tank}(t) = E_{tank}(t-1) + \left[ P_{tank}^{ch}(t)\eta_{tank}^{ch} - \frac{P_{tank}^{dis}(t)}{\eta_{tank}^{dis}} - H_{sell}(t) \right] \Delta t$$

$$E_{tankmin} \leq E_{tank}(t) \leq E_{tankmax}$$

$$0 \leq P_{tank}^{ch}(t) \leq I_{k,t}^{ch} \cdot P_{tank}^{ch,max}$$

$$0 \leq P_{tank}^{dis}(t) \leq I_{k,t}^{dis} \cdot P_{tank}^{dis,max}$$

$$0 \leq I_{k,t}^{ch} + I_{k,t}^{dis} \leq 1$$

$$E_{tank,0} = E_{tank,T}$$

$$0 \leq H_{sell}(t) \leq H_{sell,max}$$

where $E_{tank}(t)$ is an energy stored in a hydrogen storage tank during the time period t, $E_{tank}(t-1)$ is an energy stored in the hydrogen storage tank during a time period t−1, $\Delta t$ is a time interval; $P_{tank}^{ch}(t)$ and $P_{tank}^{dis}(t)$ are respectively a charging power and a discharging power of hydrogen energy storage during the time period t, which respectively correspond to the power of water electrolysis and the power of hydrogen power generation during the time period t, $\eta_{tank}^{ch}$ and $\eta_{tank}^{dis}$ are respectively a charging efficiency and a discharging efficiency of hydrogen energy storage, which are taken to be 80% in the disclosure and respectively correspond to the efficiency of water electrolysis and the efficiency of hydrogen power generation, $E_{tankmin}$ and $E_{tankmax}$ are respectively a minimum capacity and a maximum capacity of the hydrogen storage tank. $P_{tank}^{ch,max}$ and $P_{tank}^{dis,max}$ are respectively a maximum working power of a water electrolysis device and a maximum working power of a hydrogen power generation device, $I_{k,t}^{ch}$ and $I_{k,t}^{dis}$ are respectively a charging state and a discharging state of the hydrogen storage tank during the time period t and are binary variables, $I_{k,t}^{ch}=1$ indicates that the hydrogen storage tank is in the charging state during the time period t, $I_{k,t}^{dis}=1$ indicates that the hydrogen storage tank is in the discharging state during the time period t, $E_{tank,0}$ and $E_{tank,T}$ respectively represent capacities of the hydrogen storage tank at the beginning and the end of the time period, and $H_{sell,max}$ is an upper limit of a transmission power.

The battery-related constraints are:

$$SOC(t) = SOC(t-1)(1-\sigma) + \eta_{bat}^{ch} \frac{P_{bat}^{ch}(t)\Delta t}{C_{bat}} - \frac{P_{bat}^{dis}(t)\Delta t}{\eta_{bat}^{dis} C_{bat}}$$

$$0.2 \leq SOC(t) \leq 0.8$$

$$0 \leq P_{bat}^{ch}(t) \leq I_{b,t}^{ch} \cdot P_{bat}^{ch,max}$$

$$0 \leq P_{bat}^{dis}(t) \leq I_{b,t}^{dis} \cdot P_{bat}^{dis,max}$$

$$0 \leq I_{b,t}^{ch} + I_{b,t}^{dis} \leq 1$$

$$\sum_{t=1}^{T} (I_{b,t}^{ch} + I_{b,t}^{dis}) \leq N$$

$$SOC(0) = SOC(T)$$

where SOC(t) is a state of charge of the battery at a moment t, SOC(t−1) is a state of charge of the battery at a moment t−1, $\sigma$ is a self-discharge rate of the battery, which may be taken to be 0.46%/day in the disclosure, $P_{bat}^{ch}$ and $P_{bat}^{dis}$ are respectively a charging power and a discharging power of the battery, $\eta_{bat}^{ch}$ and $\eta_{bat}^{dis}$ are respectively a charging efficiency and a discharging efficiency of the battery, which are taken to be 90% in the disclosure, $C_{bat}$ is a rated capacity of the battery, $P_{bat}^{ch,max}$ and $P_{bat}^{dis,max}$ are respectively a maximum charging power and a maximum discharging power of the battery, $I_{b,t}^{ch}$ and $I_{b,t}^{dis}$ are respectively a charging state and a discharging state of the battery during the time period t and are binary variables, $I_{b,t}^{ch}=1$ indicates that the battery is in the charging state during the time period t, $I_{b,t}^{dis}=1$ indicates that the battery is in the discharging state during the time period t, and N is a maximum number of times of charge and discharge of the battery. Since the battery life is affected by the season, the number of times of charge and discharge of the battery set in different seasons in the disclosure is different and is taken to be 12 in the transition season and taken to be 10 in summer and winter.

The power balance constraint is:

$$P_{load} = P_{PV} + P_W + P_{bat}^{dis} - P_{bat}^{ch} + P_{tank}^{dis} - P_{tank}^{ch} + P_{buy}$$

where $P_{load}$ is a load demand power, $P_{PV}$ is a photovoltaic generation power, and $P_W$ is a wind power generation power.

The photovoltaic and wind turbine output constraints are:

$$0 \leq P_{PV} \leq P_{PVmax}$$

$$0 \leq P_W \leq P_{Wmax}$$

where $P_{PVmax}$ and $P_{Wmax}$ are respectively a maximum photovoltaic power and a maximum wind power generation power.

An electricity purchased power constraint is:

$$0 \leq P_{buy} \leq P_{buymax}$$

where $P_{buymax}$ is a maximum electricity purchased power.

In step 4, preferences of a decision maker are considered, a multi-objective optimization model is transformed into a single-objective model, and the model is solved using the CPLEX solver. A system operating cost $F_1$ and an environmental cost $F_2$ are integratedly considered, and the objective function after weighting and summing the costs is:

$$F = r \times F_1 + (1-r) \times F_2$$

where r is a weight coefficient, which is taken to be between 0.1 and 0.9. In the disclosure, r may be set to 0.7. Persons skilled in the art may adjust the specific value of r according to actual conditions, and the disclosure does not impose any limitation thereto.

In order to study the impact of considering electricity-hydrogen price correlation on the optimized scheduling of the integrated energy system, the following two scenarios are set up. In scenario 1, electricity-hydrogen price correlation is considered, and in scenario 2, electricity-hydrogen price correlation is not considered. Operating results before and after considering electricity-hydrogen price correlation are shown in Table 1. It can be seen from Table 1 that when electricity-hydrogen price correlation is considered, the overall level of the operating cost of the system is significantly lower than the cost when price correlation is not considered. The reason is that electricity-hydrogen price correlation potentially reflects the interaction between the hydrogen market and the electricity market. There is a certain degree of risk compensation in electricity price fluctuations in the electricity purchased cost and hydrogen price fluctuations related to the hydrogen sales revenue, resulting in an overall decrease in the operating cost of the system. Therefore, the operating cost of a system that takes price dependence into account is more competitive than a system that does not consider price dependence.

TABLE 1

Comparison table of results of scenario 1 and scenario 2

| Season | Scenario | Environmental cost/yuan | Operating cost/yuan |
| --- | --- | --- | --- |
| Transition season | 1 | 261.2931 | 520.4698 |
| | 2 | 261.3128 | 546.2093 |
| Summer | 1 | 249.7132 | 269.3021 |
| | 2 | 249.7224 | 287.9363 |
| Winter | 1 | 117.8815 | 186.6343 |
| | 2 | 120.8264 | 189.2909 |

Due to environmental issues and changes in energy demand, there are differences between input data and operation and scheduling in different seasons. Therefore, the disclosure conducts scheduling research on the integrated energy system in three seasons. The specific scheduling results (taking scenario 1 as an example) are as shown in FIG. 10A to FIG. 11C. Because the weight coefficient set in the disclosure is 0.7, the operating cost of the system accounts for a large proportion of the overall objective, so the system focuses on the operating cost and prepare and sell as much hydrogen as possible. It can be seen from FIG. 10A, FIG. 10B, FIG. 10C, FIG. 11A, FIG. 11B, and FIG. 11C that the system purchases a large amount of electricity from the power grid. A small part thereof is used to meet the power load during peak price because the electricity price is higher than the hydrogen price at this time, and it is uneconomical to purchase electricity and sell hydrogen. Therefore, excess power is not purchased during peak periods of the electricity price to produce hydrogen. A small part thereof is used to purchase electricity to be stored in the battery when the electricity price is low, and electricity is discharged when the electricity price is high to meet the load demand, reducing the electricity purchased amount during high-price periods to improve the economic efficiency of the system. Most of the remaining part is used to produce and sell hydrogen during valley prices and par prices to obtain more profits. At this time, the electricity price is lower than the hydrogen price, and greater profits can be obtained by purchasing electricity and selling hydrogen, so excess electricity is purchased during these periods to produce hydrogen. However, it should be noted that energy prices, load demands, wind and light outputs, and the number of times of charge and discharge of the battery are different in different seasons. Therefore, electricity purchase cycles, electricity purchase amounts, and hydrogen sales volumes in different seasons are also different. It can also be seen from FIG. 10A to FIG. 11C that the electricity purchased amount and the hydrogen sales volume in winter are significantly lower than those in the first two seasons because the load demand in winter is greater and the corresponding electricity price is higher than those in the other two seasons. However, the hydrogen prices in different seasons are not much different. Therefore, electricity is purchased and hydrogen is sold only during the valley-price period in winter, which also leads to the lowest operating cost of the system in winter.

In summary, the disclosure introduces a demand response strategy when constructing the optimized scheduling model, and considers the correlation of the electricity price and the hydrogen price, effectively improving the economic efficiency of the system.

Figure 12:
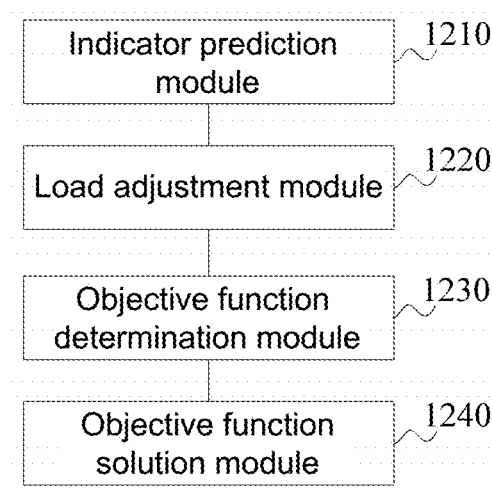
FIG. 12 is an architecture diagram of a system for optimized scheduling of an integrated energy system provided by an embodiment of the disclosure.

FIG. 12 is an architecture diagram of a system for optimized scheduling of an integrated energy system provided by an embodiment of the disclosure. As shown in FIG. 12, the system includes the following.

An indicator prediction module 1210 is used to respectively obtain marginal distribution functions of a unit electricity use consumption resource, a unit hydrogen energy harvesting resource, a wind power, a photovoltaic power, and a load within a preset time period according to historical data; determine a first joint distribution function of the unit electricity use consumption resource and the unit hydrogen energy harvesting resource and a second joint distribution function of the wind power, the photovoltaic power, and the load based on the marginal distribution functions; and then predict a unit electricity use consumption resource, a unit hydrogen energy harvesting resource, a maximum wind power, a maximum photovoltaic power, and a load within a preset time period based on the first joint distribution function and the second joint distribution function. Electricity use refers to use of electricity outside the integrated energy system, the hydrogen energy harvesting resource is obtained through transporting the hydrogen energy outward, and the load refers to electricity use amount.

A load adjustment module 1220 is used to adjust a predicted value of the load based on a dynamic change of the unit electricity use consumption resource within the preset time period to obtain a load value after performing a demand response based on the unit electricity use consumption resource to reduce a peak-valley difference of the load.

An objective function determination module 1230 is used to obtain a first objective function of a system operating consumption resource and a second objective function of an environmental consumption resource based on predicted values of the unit electricity use consumption resource, the unit hydrogen energy harvesting resource, the maximum wind power, and the maximum photovoltaic power and based on a load value of a unit electricity use consumption resource response. The first objective function includes an electricity use consumption resource, a penalty consumption resource for not using the wind energy and the solar energy, and a negative number of a resource harvested by converting the wind energy and the solar energy into the hydrogen energy. The second objective function includes a carbon emission consumption resource caused by electricity use.

An objective function solution module 1240 is used to weight and sum the first objective function and the second objective function to obtain an overall objective function, and then solve for the overall objective function to obtain an optimized scheduling result of the integrated energy system within the preset time period.

It should be understood that the above system is used to execute the method in the above embodiment. The corresponding program modules in the system have implementation principles and technical effects similar to those described in the above method. For the working process of the system, reference may be made to the corresponding process in the above method, which will not be described again here.

Based on the method in the above embodiment, an embodiment of the disclosure provides an electronic apparatus. The apparatus may include at least one memory for storing a program and at least one processor for executing the program stored in the memory. When the program stored in the memory is executed, the processor is used to execute the method described in the above embodiment.

Based on the method in the above embodiment, an embodiment of the disclosure provides a computer-readable storage medium. The computer-readable storage medium stores a computer program. When the computer program is run on a processor, the processor executes the method in the above embodiment.

Based on the method in the above embodiment, an embodiment of the disclosure provides a computer program product. When the computer program product is run on a processor, the processor executes the method in the above embodiment.

It can be understood that the processor in the embodiment of the disclosure may be a central processing unit (CPU), other general-purpose processors, digital signal processors (DSP), application specific integrated circuits (ASIC), field programmable gate arrays (FPGA), other programmable logic devices, transistor logic devices, hardware components, or any combination thereof. The general-purpose processor may be a microprocessor or any conventional processor.

The steps of the method in the embodiment of the disclosure may be implemented through hardware or by a processor executing a software command. The software command may be composed of a corresponding software module. The software module may be stored in a random access memory (RAM), a flash memory, a read-only memory (ROM), a programmable ROM (PROM), an erasable PROM (EPROM), an electrically EPROM (EEPROM), a register, a hard disk, a mobile hard disk, a CD-ROM, or any other form of storage medium well-known in the art. An exemplary storage medium is coupled to the processor, so that the processor can read information from the storage medium and write information to the storage medium. Of course, the storage medium may also be an integral part of the processor. The processor and the storage medium may be located in the ASIC.

The above embodiments may be implemented in whole or in part by software, hardware, firmware, or any combination thereof. When implemented using software, the embodiments may be implemented in whole or in part in the form of a computer program product. The computer program product includes one or more computer commands. When the computer program commands are loaded and executed on a computer, processes or functions described according to the embodiments of the disclosure are generated in whole or in part. The computer may be a general-purpose computer, a specific-purpose computer, a computer network, or other programmable systems. The computer command may be stored in a computer-readable storage medium or transmitted through the computer-readable storage medium. The computer command may be transmitted from one website, computer, server, or data center to another website, computer, server, or data center through wired (for example, coaxial cable, optical fiber, and digital subscriber line (DSL)) or wireless (for example, infrared, wireless, microwave, etc.) means. The computer-readable storage medium may be any available medium that can be accessed by a computer or a data storage apparatus such as a server or a data center including one or more available media. The available media may be magnetic media (for example, floppy disk, hard disk, and magnetic tape), optical media (for example, DVD), semiconductor media (for example, solid state disk (SSD)), etc.

It can be understood that various reference numerals involved in the embodiments of the disclosure are only for convenience of description and are not used to limit the scope of the embodiments of the disclosure.

It is easy for persons skilled in the art to understand that the above descriptions are only preferred embodiments of the disclosure and are not intended to limit the disclosure. Any modifications, equivalent substitutions, improvements, etc., made within the spirit and principles of the disclosure should be included in the protection scope of the disclosure.

What is claimed is:

1. A method for optimized scheduling of an integrated energy system, wherein the integrated energy system comprises a wind energy, a solar energy, and a hydrogen energy, the method comprising:

by using a processor, respectively obtaining marginal distribution functions of a unit electricity use consumption resource, a unit hydrogen energy harvesting resource, a wind power, a photovoltaic power, and a load within a preset time period according to historical data; determining a first joint distribution function of the unit electricity use consumption resource and the unit hydrogen energy harvesting resource and a second joint distribution function of the wind power, the photovoltaic power, and the load based on the marginal distribution functions; then predicting a unit electricity use consumption resource, a unit hydrogen energy harvesting resource, a maximum wind power, a maximum photovoltaic power, and a load within the preset time period based on the first joint distribution function and the second joint distribution function, wherein electricity use refers to use of electricity outside the integrated energy system, the hydrogen energy harvesting resource is obtained through transporting the hydrogen energy outward, and the load refers to electricity use amount; estimating the marginal distribution functions of the unit electricity use consumption resource, the unit hydrogen energy harvesting resource, the wind power, the photovoltaic power, and the load by adopting a non-parametric kernel density estimation method; generating the first joint distribution function of the unit electricity use consumption resource and the unit hydrogen energy harvesting resource using a two-dimensional Frank Copula function; generating the second joint distribution function of the wind power, the photovoltaic power, and the load using a three-dimensional Frank Copula function, wherein Copula link functions C(·) used in the above processes of generating the joint distribution functions are respectively:

$$C(v_1, v_2, \theta_1) = -\frac{1}{\theta_1}\ln\left[1 + \frac{(\exp(-\theta_1 v_1) - 1)(\exp(-\theta_1 v_2) - 1)}{\exp(-\theta_1) - 1}\right],$$

where $v_1$ and $v_2$ are respectively the marginal distribution functions of the unit electricity use consumption resource and the unit hydrogen energy harvesting resource, and $\theta_1$ is a parameter of the two-dimensional Frank Copula function; and $$C(u_1, u_2, u_3) = -\frac{1}{\theta_2}\ln\left[1 + \frac{(\exp(-\theta_2 u_1) - 1)(\exp(-\theta_2 u_2) - 1)(\exp(-\theta_2 u_3) - 1)}{[\exp(-\theta_2) - 1]^2}\right],$$

where $u_1$, $u_2$, and $u_3$ respectively represent the marginal distribution functions of the wind power, the photovoltaic power, and the load, and $\theta_2$ is a parameter of the three-dimensional Frank Copula function; sampling the first joint distribution function and the second joint distribution function, and inversely transforming a sampling result and the two joint distribution functions to obtain the unit electricity use consumption resource, the unit hydrogen energy harvesting resource, the maximum wind power, the maximum photovoltaic power, and the load corresponding to each time period;

by using the processor, adjusting a predicted value of the load based on a dynamic change of the unit electricity use consumption resource within the preset time period to obtain a load value after performing a demand response based on the unit electricity use consumption resource to reduce a peak-valley difference of the load, wherein the preset time period comprises a plurality of time periods, and the load value based on a unit electricity use consumption resource response is determined through a following formula:

$$\begin{bmatrix} q_1 \\ q_2 \\ \vdots \\ q_m \end{bmatrix} = \begin{bmatrix} q_{01} \\ q_{02} \\ \vdots \\ q_{0m} \end{bmatrix} + \begin{bmatrix} q_{01} & \cdots & \cdots & 0 \\ \vdots & q_{02} & \cdots & \vdots \\ \vdots & \vdots & \ddots & \vdots \\ 0 & \cdots & \cdots & q_{0m} \end{bmatrix} E \begin{bmatrix} \Delta p_1/p_{10} \\ \Delta p_2/p_{20} \\ \vdots \\ \Delta p_m/p_{m0} \end{bmatrix},$$

where $q_i$ is a load after an i-th time period demand response, $q_{0i}$ is a predicted value of the load before the i-th time period demand response, i=1, 2, ..., m, where m is a total number of periods of the preset time period, $\Delta p_j$ is an increment of the unit electricity use consumption resource before and after a j-th time period demand response, $\Delta p_j = p_j - p_{j0}$, j=1, 2, ..., m, $p_{j0}$ is the unit electricity use consumption resource before the j-th time period demand response, $p_j$ is the unit electricity use consumption resource after the j-th time period demand response, which is a predicted unit electricity use consumption resource, and E is an elasticity matrix of the load and the unit electricity use consumption resource;

$$E = \begin{bmatrix} e_{11} & e_{12} & \cdots & e_{1m} \\ e_{21} & e_{22} & \cdots & e_{2m} \\ \vdots & \vdots & & \vdots \\ e_{m1} & e_{m2} & \cdots & e_{mm} \end{bmatrix}, \text{ where } e_{ij} = \frac{\Delta q_i}{q_{0i}} \bigg/ \frac{\Delta p_j}{p_{j0}},$$

$\Delta q_i$ is a load change before and after the demand response, $\Delta q_i = q_i - q_{0i}$, $e_{ij}$ is an elasticity coefficient, when j=i, $e_{ij}$ is a self-elasticity coefficient, and when j≠i, $e_{ij}$ is a cross-elasticity coefficient;

by using the processor, obtaining a first objective function of a system operating consumption resource and a second objective function of an environmental consumption resource based on predicted values of the unit electricity use consumption resource, the unit hydrogen energy harvesting resource, the maximum wind power, and the maximum photovoltaic power and based on the load value of the unit electricity use consumption resource response, wherein the first objective function comprises an electricity use consumption resource, a penalty consumption resource for not using the wind energy and the solar energy, and a negative number of a resource harvested by converting the wind energy and the solar energy into the hydrogen energy, the second objective function comprises a carbon emission consumption resource caused by electricity use, the first objective function is: $F_1 = \min(f_{buy} + f_{dis} - f_{sell,H})$, where $F_1$ is the system operating consumption resource, $f_{buy}$ is the electricity use consumption resource of the system, $f_{dis}$ is the penalty consumption resource for not using the wind energy and the solar energy of the system, and $f_{sell,H}$ is the resource harvested by converting the wind energy and the solar energy into the hydrogen energy;

$$f_{buy} = \sum_{t=1}^{T} \beta_t P_{buy}(t),$$

where $\beta_t$ is the predicted value of the unit electricity use consumption resource during a time period t and $P_{buy}(t)$ is the load during the time period t;

$$f_{dis} = \omega \sum_{t=1}^{T} [P_{W,dis}(t) + P_{PV,dis}(t)],$$

where ω is a unit penalty consumption resource for not using the wind energy and the solar energy, and $P_{W,dis}(t)$ and $P_{PV,dis}(t)$ are respectively a wind abandonment power and a solar abandonment power during the time period t; the wind abandonment power refers to unused wind power, and the solar abandonment power refers to unused photovoltaic power;

$$f_{sell,H} = \sum_{t=1}^{T} \alpha_t H_{sell}(t),$$

where $\alpha_t$ is the unit hydrogen energy harvesting resource during the time period t and $H_{sell}$ (t) is the hydrogen energy transported outward during the time period t; and the second objective function is:

$$F_2 = \min f_{CO_2}$$

$$f_{CO_2} = \begin{cases} \lambda E_{IESt}, & E_{IESt} \leq l \\ \lambda l + \lambda(1+\alpha)(E_{IESt} - l), & l \leq E_{IESt} \leq 2l \\ \lambda(2+\alpha)l + \lambda(1+2\alpha)(E_{IESt} - 2l), & 2l \leq E_{IESt} \leq 3l \\ \lambda(3+3\alpha)l + \lambda(1+3\alpha)(E_{IESt} - 3l), & 3l \leq E_{IESt} \leq 4l \\ \lambda(4+6\alpha)l + \lambda(1+4\alpha)(E_{IESt} - 4l), & E_{IESt} \geq 4l \end{cases}$$

where $F_2$ is the environmental consumption resource, $f_{CO_2}$ is a tiered carbon emission consumption resource of the system, $\lambda$ is a basic consumption resource of carbon emission, l is an interval division length of carbon emission, $\alpha$ is a growth rate of consumption resource, and $E_{IESt}$ is a carbon emission amount;

$$\begin{cases} E_{IESt} = E_{IESa} - E_{IES} \\ E_{IESa} = \chi_{ca} P_{buy} \\ E_{IES} = \chi_c P_{buy} \end{cases},$$

where $E_{IESa}$ is an actual carbon emission amount generated by the system, $E_{IES}$ is a total carbon emission quota allocated to the system, $\chi_{ca}$ is a carbon emission amount generated by the system after a unit of electricity is used, $P_{buy}$ (t) is the load, and $\chi_c$ is a free carbon emission quota obtained by the system after a unit of electricity is used from outside the system;

by using the processor, weighting and summing the first objective function and the second objective function to obtain an overall objective function, and then solving for the overall objective function to obtain an optimized scheduling result of the integrated energy system within the preset time period, so that an economic efficiency of the integrated energy system is improved and a carbon dioxide emission is reduced, wherein the overall objective function is an optimized scheduling model established by using data generated by the two-dimensional Frank Copula function, the three-dimensional Frank Copula function and the load formula as input parameters, wherein the optimized scheduling result comprises an electricity use, a battery output, a hydrogen energy storage output, a hydrogen energy export, a photovoltaic output and a wind power output during each time period, wherein based on the optimized scheduling result, power is selectively apportioned to loads during peak demand periods, and the power includes the battery output, the hydrogen energy storage output, the hydrogen energy export, and wherein a battery regulates charge and discharge cycles, and regulates hydrogen production in response to the optimized scheduling result.

2. The method according to claim 1, wherein constraints of the overall objective function comprise photovoltaic and wind power output constraints, an electric power constraint, a battery constraint, a hydrogen energy storage constraint, and a power balance constraint.

3. The method according to claim 2, wherein the power balance constraint is:

$$P_{load} = P_{PV} + P_W + P_{bat}^{dis} - P_{bat}^{ch} + P_{tank}^{dis} - P_{tank}^{ch} + P_{buy}$$

where $P_{load}$ is a load demand power, $P_{PV}$ is the photovoltaic output, $P_W$ is the wind load power output, $P_{buy}$ is the load, $P_{tank}^{ch}$ and $P_{tank}^{dis}$ are respectively a charging power and a discharging power of hydrogen energy storage, and $P_{bat}^{ch}$ and $P_{bad}^{dis}$ are respectively a charging power and a discharging power of a battery; and the photovoltaic output and wind power output constraints are:

$$0 \leq P_{PV} \leq P_{PVmax}$$

$$0 \leq P_W \leq P_{Wmax}$$

where $P_{PVmax}$ and $P_{Wmax}$ are respectively the predicted values of the maximum photovoltaic power and the maximum wind power.

4. A system for optimized scheduling of an integrated energy system, wherein the integrated energy system comprises a wind energy, a solar energy, and a hydrogen energy, the system comprising:

a processor, configured to respectively obtain marginal distribution functions of a unit electricity use consumption resource, a unit hydrogen energy harvesting resource, a wind power, a photovoltaic power, and a load within a preset time period according to historical data; determine a first joint distribution function of the unit electricity use consumption resource and the unit hydrogen energy harvesting resource and a second joint distribution function of the wind power, the photovoltaic power, and the load based on the marginal distribution functions; then predict a unit electricity use consumption resource, a unit hydrogen energy harvesting resource, a maximum wind power, a maximum photovoltaic power, and a load within a preset time period based on the first joint distribution function and the second joint distribution function, wherein electricity use refers to use of electricity outside the integrated energy system, the hydrogen energy harvesting resource is obtained through transporting the hydrogen energy outward, and the load refers to electricity use amount; specifically to estimate the marginal distribution functions of the unit electricity use consumption resource, the unit hydrogen energy harvesting resource, the wind power, the photovoltaic power, and the load by adopting a non-parametric kernel density estimation method; generate the first joint distribution function of the unit electricity use consumption resource and the unit hydrogen energy harvesting resource using a two-dimensional Frank Copula function; generate the second joint distribution function of the wind power, the photovoltaic power, and the load using a three-dimensional Frank Copula function, wherein Copula link functions C(·) used in the above processes of generating the joint distribution functions are respectively:

$$C(v_1, v_2, \theta_1) = -\frac{1}{\theta_1} \ln\left[1 + \frac{(\exp(-\theta_1 v_1) - 1)(\exp(-\theta_1 v_2) - 1)}{\exp(-\theta_1) - 1}\right],$$

where $v_1$ and $v_2$ are respectively the marginal distribution functions of the unit electricity use consumption resource and the unit hydrogen energy harvesting resource, and $\theta_1$ is a parameter of the two-dimensional Frank Copula function; and $$C(u_1, u_2, u_3) = -\frac{1}{\theta_2}\ln\left[1 + \frac{(\exp(-\theta_2 u_1) - 1)(\exp(-\theta_2 u_2) - 1)(\exp(-\theta_2 u_3) - 1)}{[\exp(-\theta_2) - 1]^2}\right],$$

where $u_1$, $u_2$, and $u_3$ respectively represent the marginal distribution functions of the wind power, the photovoltaic power, and the load, and $\theta_2$ is a parameter of the three-dimensional Frank Copula function; sample the first joint distribution function and the second joint distribution function, and inversely transform a sampling result and the two joint distribution functions to obtain the unit electricity use consumption resource, the unit hydrogen energy harvesting resource, the maximum wind power, the maximum photovoltaic power, and the load corresponding to each time period;

wherein the processor is further configured to adjust a predicted value of the load based on a dynamic change of the unit electricity use consumption resource within the preset time period to obtain a load value after performing a demand response based on the unit electricity use consumption resource to reduce a peak-valley difference of the load, wherein the preset time period comprises a plurality of time periods, and the load value based on a unit electricity use consumption resource response is determined through a following formula:

$$\begin{bmatrix} q_1 \\ q_2 \\ \vdots \\ q_m \end{bmatrix} = \begin{bmatrix} q_{01} \\ q_{02} \\ \vdots \\ q_{0m} \end{bmatrix} + \begin{bmatrix} q_{01} & \cdots & \cdots & 0 \\ \vdots & q_{02} & \cdots & \vdots \\ \vdots & \vdots & \ddots & \vdots \\ 0 & \cdots & \cdots & q_{0m} \end{bmatrix} E \begin{bmatrix} \Delta p_1/p_{10} \\ \Delta p_2/p_{20} \\ \vdots \\ \Delta p_m/p_{m0} \end{bmatrix},$$

where $q_i$ is a load after an i-th time period demand response, $q_{0i}$ is a predicted value of the load before the i-th time period demand response, $i=1, 2, \ldots, m$, where m is a total number of periods of the preset time period, $\Delta p_j$ is an increment of the unit electricity use consumption resource before and after a j-th time period demand response, $\Delta p_j = p_j - p_{j0}$, $j=1, 2, \ldots, m$, $p_{j0}$ is the unit electricity use consumption resource before the j-th time period demand response, $p_j$ is the unit electricity use consumption resource after the j-th time period demand response, which is a predicted unit electricity use consumption resource, and E is an elasticity matrix of the load and the unit electricity use consumption resource;

$$E = \begin{bmatrix} e_{11} & e_{12} & \cdots & e_{1m} \\ e_{21} & e_{22} & \cdots & e_{2m} \\ \vdots & \vdots & & \vdots \\ e_{m1} & e_{m2} & \cdots & e_{mm} \end{bmatrix}, \text{ where } e_{ij} = \frac{\Delta q_i}{q_{0i}} \bigg/ \frac{\Delta p_j}{p_{j0}},$$

$\Delta q_i$ is a load change before and after the demand response, $\Delta q_i = q_i - q_{0i}$, $e_{ij}$ is an elasticity coefficient, when $j=i$, $e_{ij}$ is a self-elasticity coefficient, and when $j\neq i$, $e_{ij}$ is a cross-elasticity coefficient;

wherein the processor is further configured to obtain a first objective function of a system operating consumption resource and a second objective function of an environmental consumption resource based on predicted values of the unit electricity use consumption resource, the unit hydrogen energy harvesting resource, the maximum wind power, and the maximum photovoltaic power and based on the load value of the unit electricity use consumption resource response, wherein the first objective function comprises an electricity use consumption resource, a penalty consumption resource for not using the wind energy and the light energy, and a negative number of a resource harvested by converting the wind energy and the solar energy into the hydrogen energy, the second objective function comprises a carbon emission consumption resource caused by electricity use, the first objective function is: $F_1 = \min(f_{buy} + f_{dis} - f_{sell,H})$, where $F_1$ is the system operating consumption resource, $f_{buy}$ is the electricity use consumption resource of the system, $f_{dis}$ is the penalty consumption resource for not using the wind energy and the solar energy of the system, and $f_{sell,H}$ is the resource harvested by converting the wind energy and the solar energy into the hydrogen energy;

$$f_{buy} = \sum_{t=1}^{T} \beta_t P_{buy}(t),$$

where $\beta_t$ is the predicted value of the unit electricity use consumption resource during a time period t and $P_{buy}(t)$ is the load during the time period t;

$$f_{dis} = \omega \sum_{t=1}^{T} [P_{W,dis}(t) + P_{PV,dis}(t)],$$

where $\omega$ is a unit penalty consumption resource for not using the wind energy and the solar energy, and $P_{W,dis}(t)$ and $P_{PV,dis}(t)$ are respectively a wind abandonment power and a light abandonment power during the time period t; the wind abandonment power refers to unused wind power, and the solar abandonment power refers to unused photovoltaic power;

$$f_{sell,H} = \sum_{t=1}^{T} \alpha_t H_{sell}(t),$$

where $\alpha_t$ is the unit hydrogen energy harvesting resource during the time period t and $H_{sell}(t)$ is the hydrogen energy transported outward during the time period t; and
the second objective function is:

$$F_2 = \min f_{CO_2}$$

$$f_{CO_2} = \begin{cases} \lambda E_{IESt}, & E_{IESt} \leq l \\ \lambda l + \lambda(1+\alpha)(E_{IESt} - l), & l \leq E_{IESt} \leq 2l \\ \lambda(2+\alpha)l + \lambda(1+2\alpha)(E_{IESt} - 2l), & 2l \leq E_{IESt} \leq 3l, \\ \lambda(3+3\alpha)l + \lambda(1+3\alpha)(E_{IESt} - 3l), & 3l \leq E_{IESt} \leq 4l \\ \lambda(4+6\alpha)l + \lambda(1+4\alpha)(E_{IESt} - 4l), & E_{IESt} \geq 4l \end{cases}$$

where $F_2$ is the environmental consumption resource, $f_{CO_2}$ is a tiered carbon emission consumption resource of the system, $\lambda$ is a basic consumption resource of carbon emission, l is an interval division length of carbon emission, α is a growth rate of consumption resource, and $E_{IESt}$ is a carbon emission amount;

$$\begin{cases} E_{IESt} = E_{IESa} - E_{IES} \\ E_{IESa} = \chi_{ca} P_{buy} \\ E_{IES} = \chi_c P_{buy} \end{cases},$$

where $E_{IESa}$ is an actual carbon emission amount generated by the system, $E_{IES}$ is a total carbon emission quota allocated to the system, $X$ ca is a carbon emission amount generated by the system after a unit of electricity is used, $P_{buy}$ (t) is the load, and $\chi_c$ is a free carbon emission quota obtained by the system after a unit of electricity is used from outside the system;

wherein the processor is further configured to weight and sum the first objective function and the second objective function to obtain an overall objective function, and then solve for the overall objective function to obtain an optimized scheduling result of the integrated energy system within the preset time period, so that an economic efficiency of the integrated energy system is improved and a carbon dioxide emission is reduced, wherein the overall objective function is an optimized scheduling model established by using data generated by the two-dimensional Frank Copula function, the three-dimensional Frank Copula function and the load formula as input parameters, wherein the optimized scheduling result comprises an electricity use, a battery output, a hydrogen energy storage output, a hydrogen energy export, a photovoltaic output and a wind power output during each time period, wherein based on the optimized scheduling result, power is selectively apportioned to loads during peak demand periods, and the power includes the battery output, the hydrogen energy storage output, the hydrogen energy export, and wherein a battery regulates charge and discharge cycles, and regulates hydrogen production in response to the optimized scheduling result.

5. An electronic apparatus, comprising:
at least one memory, configured to store a program;
at least one processor, configured to execute the program stored in the memory, wherein when the program stored in the memory is executed, the processor is used to execute the method according to claim 1.

6. An electronic apparatus, comprising:
at least one memory, configured to store a program;
at least one processor, configured to execute the program stored in the memory, wherein when the program stored in the memory is executed, the processor is used to execute the method according to claim 2.

7. An electronic apparatus, comprising:
at least one memory, configured to store a program;
at least one processor, configured to execute the program stored in the memory, wherein when the program stored in the memory is executed, the processor is used to execute the method according to claim 3.

* * * * *